(12) United States Patent
Dunn et al.

(10) Patent No.: US 11,414,344 B2
(45) Date of Patent: Aug. 16, 2022

(54) APPARATUS AND METHODS FOR ACCURATE HIGH-SPEED MARKING OF OPTICAL FIBERS

(71) Applicant: CORNING INCORPORATED, Corning, NY (US)

(72) Inventors: Steven Howard Dunn, Wilmington, NC (US); Aditya Kaimal, Wilmington, NC (US); Kelvin Nguyen, Fort Worth, TX (US)

(73) Assignee: Corning Incorporated, Corning, NY (US)

( * ) Notice: Subject to any disclaimer, the term of this patent is extended or adjusted under 35 U.S.C. 154(b) by 221 days.

(21) Appl. No.: 16/930,784

(22) Filed: Jul. 16, 2020

(65) Prior Publication Data

US 2021/0024413 A1    Jan. 28, 2021

Related U.S. Application Data

(60) Provisional application No. 62/877,430, filed on Jul. 23, 2019.

(51) Int. Cl.
*B41J 3/407* (2006.01)
*C03C 25/106* (2018.01)
(Continued)

(52) U.S. Cl.
CPC ......... *C03C 25/106* (2013.01); *B41J 2/04558* (2013.01); *B41J 2/04586* (2013.01);
(Continued)

(58) Field of Classification Search
CPC ..................................................... B41J 3/4073
See application file for complete search history.

(56) References Cited

U.S. PATENT DOCUMENTS 2,929,136 A    3/1960 Karl et al.
3,021,815 A    2/1962 Joseph et al.
(Continued)

FOREIGN PATENT DOCUMENTS

CN    201371627 Y    12/2009
CN    101726806 A    6/2010
(Continued)

OTHER PUBLICATIONS

International Search Report and Written Opinion of the International Searching Authority; PCT/US2020/041751; dated Oct. 16, 2020; 9 Pages; European Patent Office.

*Primary Examiner* — Scott A Richmond
(74) *Attorney, Agent, or Firm* — Kevin L. Bray

(57) ABSTRACT

The apparatus and methods include moving an optical fiber over a fiber path that includes a marking location at which resides a marking unit that dispenses an ink-jet stream. A centering method is performed whereby the optical fiber is incrementally moved in a lateral direction through the path of the ink-stream and the mark number density of marks formed on the optical fiber is measured along with the optical fiber position. A process window is defined by the range of lateral fiber positions over which a target mark number density is formed on a consistent basis. A controller calculates an optimum fiber path position and stores it memory for future reference while also moving the fiber path to the optimum position. The initially wet ink marks are dried and the fiber coated with a transparent protective overcoat to form a coated and marked optical fiber.

23 Claims, 14 Drawing Sheets

(51) Int. Cl.
*B41J 2/045* (2006.01)
*C03C 25/1065* (2018.01)
*C03C 25/12* (2006.01)

(52) U.S. Cl.
CPC ......... *B41J 3/4073* (2013.01); *C03C 25/1065* (2013.01); *C03C 25/12* (2013.01)

(56) References Cited

U.S. PATENT DOCUMENTS

| | | |
|---|---|---|
| 3,434,456 A | 3/1969 | Chester et al. |
| 3,807,025 A | 4/1974 | Gudmestad |
| 4,530,750 A | 7/1985 | Aisenberg et al. |
| 4,619,842 A | 10/1986 | Moss et al. |
| 4,629,285 A | 12/1986 | Carter et al. |
| 4,775,640 A | 10/1988 | Chan |
| 5,119,464 A | 6/1992 | Freychet et al. |
| 5,151,306 A | 9/1992 | Andrews et al. |
| 5,377,292 A | 12/1994 | Bartling et al. |
| 5,796,905 A | 8/1998 | Hoffart et al. |
| 6,404,972 B1 | 6/2002 | Pasch et al. |
| 6,576,591 B1 | 6/2003 | Snowdon et al. |
| 6,650,815 B2 | 11/2003 | Hawtof et al. |
| 7,072,554 B2 | 7/2006 | Watanabe et al. |
| 8,768,128 B1 | 7/2014 | Garner et al. |
| 10,801,883 B2 | 10/2020 | Dunn et al. |
| 2013/0343712 A1* | 12/2013 | Matsuzawa .......... G02B 6/4432 118/712 |
| 2015/0009262 A1 | 1/2015 | Bell et al. |
| 2015/0352861 A1 | 12/2015 | Isaji et al. |
| 2017/0045706 A1* | 2/2017 | Carberry ................ B41J 3/4073 |
| 2020/0215825 A1 | 7/2020 | Kaimal et al. |

FOREIGN PATENT DOCUMENTS

| | | |
|---|---|---|
| CN | 108705849 A | 10/2018 |
| CN | 108994461 A | 12/2018 |
| JP | 01-150105 A | 6/1989 |
| WO | 01/46738 A1 | 6/2001 |

* cited by examiner

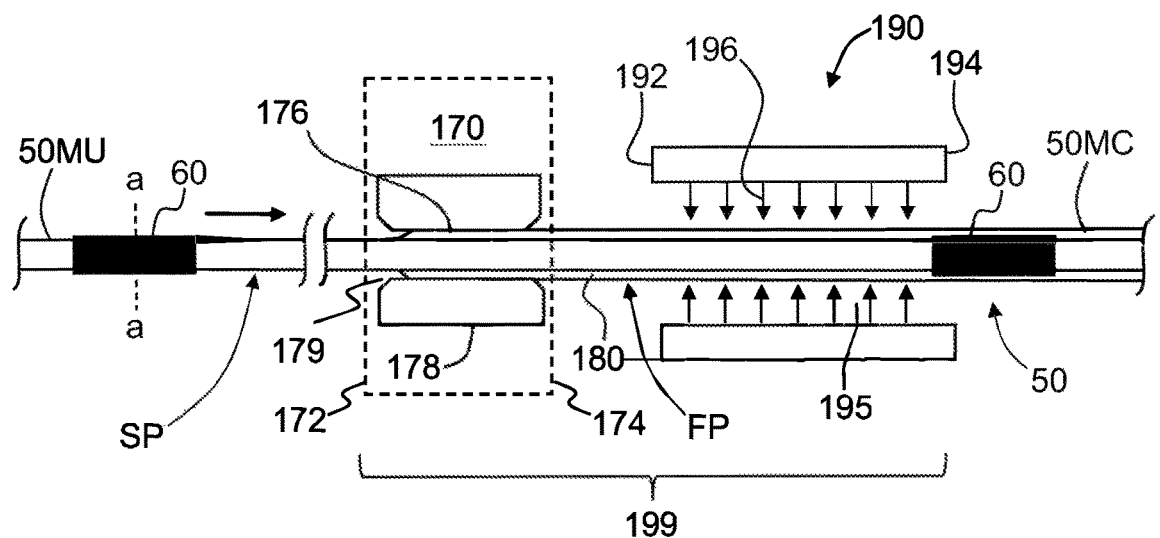
FIG. 5
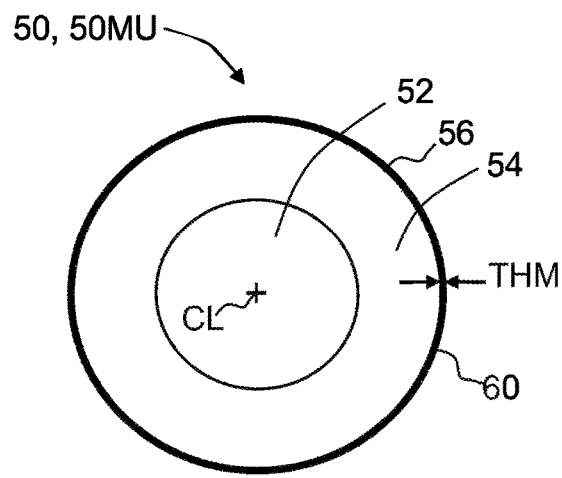 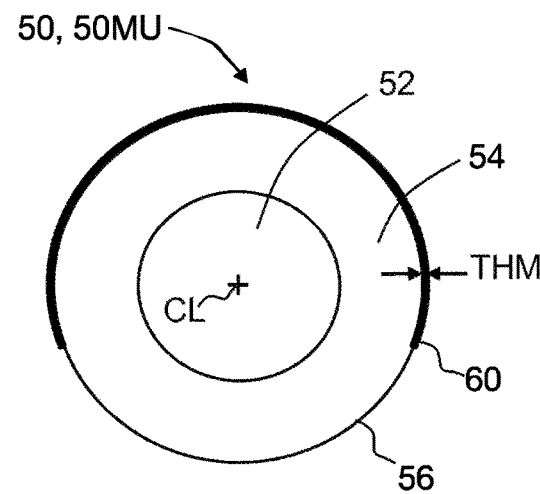
FIG. 6A      FIG. 6B

APPARATUS AND METHODS FOR ACCURATE HIGH-SPEED MARKING OF OPTICAL FIBERS

This application claims the benefit of priority under 35 U.S.C. § 119 of U.S. Provisional Application Ser. No. 62/877,430 filed on Jul. 23, 2019 the content of which is relied upon and incorporated herein by reference in its entirety.

FIELD

The present disclosure relates to optical fibers, and in particular relates to apparatus and methods for accurate high-speed marking of optical fibers.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. This requires a coding scheme so that the individual optical fibers can be identified. Such coding schemes can include fiber color or individualized markings on the outer surface of the optical fibers.

A problem with color-based coding schemes is that there are not enough colors for effectively color coding more than about eighteen optical fibers. A problem with marking the outer surface of optical fibers is that the markings can wear off over time by normal wear and tear and by manual handling by field workers. Another problem with marking the outer surface of optical fibers is that present-day methods and apparatus used to perform the marking are relatively slow and prone to marking errors. A main cause of marking errors is due to the optical fibers not being properly centered relative to the marking unit and in particular to the ink-jet stream emanating from the printer head. Since the diameter of the ink droplets can be on the order of 50 microns while an optical fiber can have a diameter of 125 microns or 250 microns for example, it is relatively difficult to achieve proper alignment of the moving optical fiber with the stream of ink droplets. Unfortunately, proper alignment is required to minimize marking errors to achieve accurate high-speed marking of optical fibers.

SUMMARY

An embodiment of the disclosure is directed to a method of accurately marking an optical fiber having an outer surface, comprising: moving an optical fiber at a line speed greater than 2 m/s past a marking unit configured to intermittently dispense an ink-jet stream to form spaced-apart marks on the outer surface of the optical fiber; laterally moving the optical fiber relative to the ink-jet stream in lateral increments $\delta z$ to define a plurality of lateral positions of the optical fiber; measuring a mark number density of the marks for each lateral position of the plurality of lateral positions; establishing a range of the lateral positions where the mark number density is within a mark number density range; setting the optical fiber to a fiber marking position within the range of lateral positions; and forming the marks on the outer surface of the optical fiber with the optical fiber set to the fiber marking position.

Another embodiment of the disclosure is directed to a method of accurately marking an optical fiber having an outer surface, comprising: moving an optical fiber at a line speed greater than 2 m/s past a marking unit, the marking unit intermittently dispensing an ink-jet stream to form spaced apart marks on the outer surface of the optical fiber; moving the optical fiber in lateral increments $\delta z$ relative to the ink-jet stream to define a plurality of different lateral measurement positions, wherein multiple ones of the plurality of different lateral measurement positions cause the optical fiber to intersect the ink-jet stream; for each different lateral measurement position, measuring a mark number density $N_M$ of the marks formed on the outer surface of the optical fiber to establish a set $S_M$ of measured mark number densities $N_{Mi}$; comparing the measured mark number densities for the different lateral measurement positions to a target mark number density range; identifying a range of the different lateral measurement positions over which the measured mark number densities are within the target mark number density range; setting the fiber to an optimum fiber marking position that resides substantially in the middle of the range of the different lateral measurement positions; and forming the marks on the outer surface of the optical fiber with the fiber marking position set at the optimum fiber marking position.

Another embodiment of the disclosure is directed to a method of accurately forming spaced-apart marks on an optical fiber, comprising: causing the optical fiber to move over a fiber path, wherein the moving optical fiber has an outer surface; printing the spaced-apart marks on the outer surface of the moving optical fiber with ink from an ink-jet printer head for different lateral positions of the moving optical fiber relative to the ink-jet printer head; measuring a mark number density of the marks for each of the different lateral positions and comparing the measured mark number densities to a target mark number density range to establish a range of fiber marking positions defined by the different lateral positions wherein the measured mark number densities are within the target mark number density range; placing the optical fiber at a fiber marking position that is substantially at the middle of the range of fiber marking positions; and forming the spaced apart marks on the optical fiber with the optical fiber at the fiber marking position.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 5 is a close-up view of the portion of the high-speed optical fiber marking apparatus that includes an overcoat applicator and a curing system.

FIG. 6A is a cross-sectional view of the marked but uncoated optical fiber as taken along the line a-a in FIG. 4 at a location of a mark, and showing the thickness (THM) of the mark.

FIG. 6B is similar to FIG. 6A and illustrates an example mark that does not make a complete ring about the outer surface of the optical fiber but that covers more than 180° of the optical fiber circumference.

DETAILED DESCRIPTION

Figure 1A:
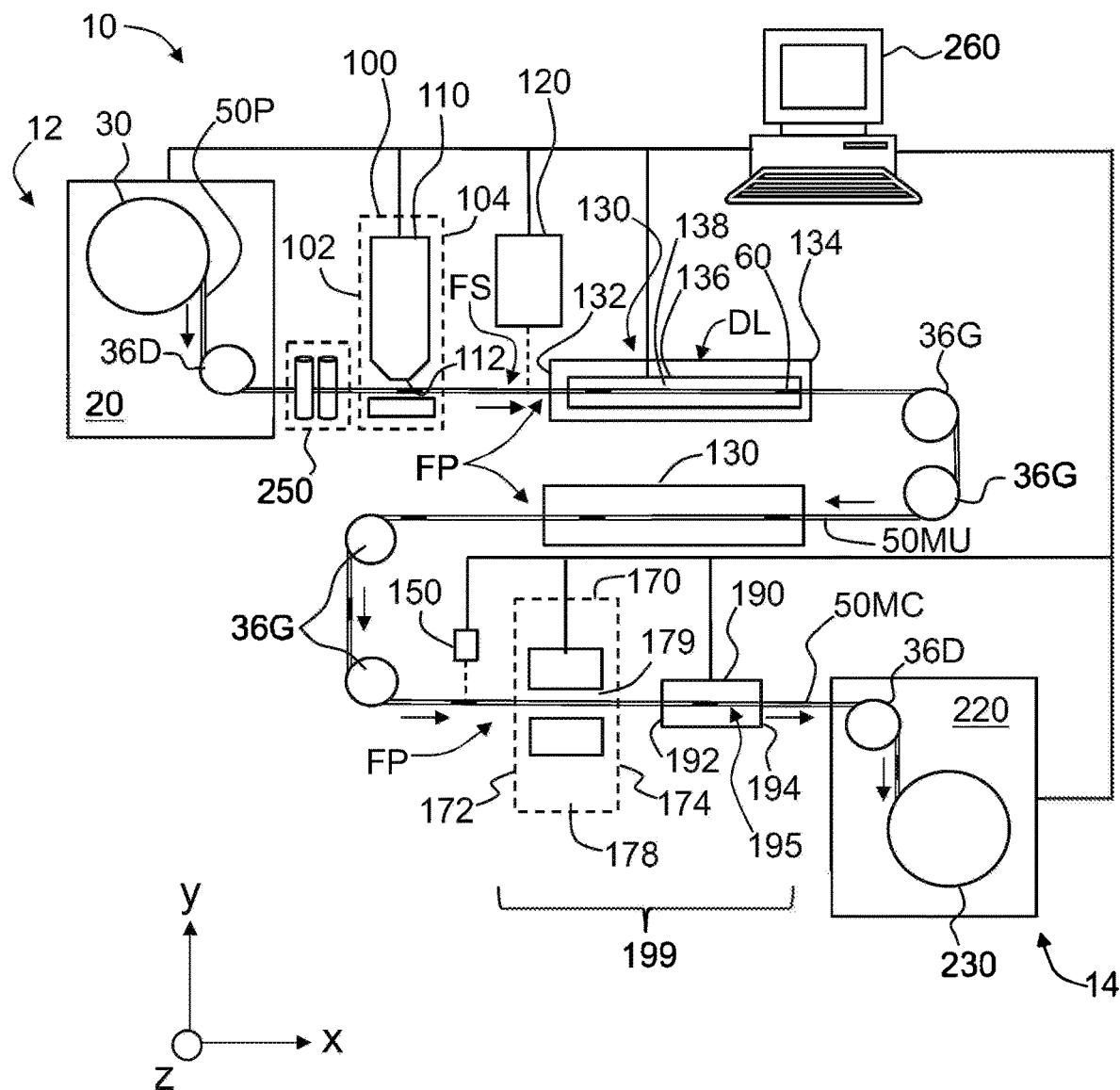
FIG. 1A is a schematic diagram of an example high-speed optical fiber marking apparatus for marking an optical fiber as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation.

The terms "downstream" and "upstream" are used herein to indicate positions relative to the direction of the movement of the optical fiber over a fiber path through the high-speed optical fiber marking apparatus as described below. Thus, an apparatus component B that is downstream (upstream) of an apparatus component A processes a given section of the optical fiber after (before) it is processed by the apparatus component A.

The number density of marks is denoted as N and is the number of marks per unit length, and is given as the number of marks per meter (m) unless stated otherwise. The number density of marks can also be referred to as "rings per meter."

The abbreviation "μm" is used to denote "micron" or "micrometer," with the abbreviation "nm" is used to denote "nanometer."

The "fiber speed" is the speed at which the optical fiber moves over the fiber path through the high-speed optical fiber marking apparatus, and is also referred to in the art as the "line speed."

The term "mark" as used herein is used to denote a type of simple indicia formed on an outer surface of the optical fiber over an axial mark length LM. The marks are spaced apart by an axial mark spacing LS. The term "patterned mark" is a type of mark that includes at least one space or gap within the mark, i.e., over the mark length. Such a space or gap within a given mark is not the same as the axial mark spacing LS, which as noted above is the spacing between adjacent marks. The patterned mark has a pattern length LP, which in an example can be same as or similar to the mark length LM, or can be substantially longer (e.g., 1.5·LM≤LP≤4·LM). In an example, the mark length LM or the pattern length LP are substantially smaller than the axial mark spacing LS. In examples discussed below, a patterned mark can be formed by a single ink-jet printer head or by using multiple ink-jet printer heads.

The term "fiber positioning device" as used herein means a device that positions the optical fiber relative to a reference position such as the marking location of the marking unit. In an example, the fiber positioning device is also configured to reduce an amount of vibration of the optical fiber moving through the high-speed optical fiber marking apparatus.

The term "accurate high-speed marking" of the optical fibers means that the optical fiber marking process forms marks on the optical fiber at a target number density $N_T$ to within a select marking tolerance $\Delta N$ when the optical fiber moves over the fiber path at a reasonably high fiber speed, e.g., 2 m/s or greater. In the discussion below, this is achieved by operating the high-speed optical fiber marking apparatus within a determined "process window," i.e., under select operating conditions that include substantially centering the fiber path relative to the stream of ink droplets.

Aspects of the disclosure include how to establish and monitor such centering, which has been problematic in the art of optical fiber marking.

High-Speed Optical Fiber Marking Apparatus

FIG. 1A is a schematic diagram of a high-speed optical fiber marking apparatus ("apparatus") 10 for marking an optical fiber ("fiber") 50. The apparatus 10 has a first or starting end 12 and a second or finishing end 14. The fiber 50 is subjected to various processes (described below) and is in various states as it passes through apparatus 10. Portions of the fiber 50 that differ in state or configuration are referred to herein as "fiber sections." As discussed more fully below, the fiber 50 includes fiber sections 50P (unmarked fiber), fiber sections 50MU (marked fiber), and fiber sections 50MC (marked fiber having an overcoat covering the marks). Fiber sections 50P, 50MU, and 50MC are referred to, respectively, as unmarked section 50P, marked section 50MU, and covered section 50MC, respectively. Portions of fiber 50 in fiber sections 50P, 50MU, and 50MC are referred to, respectively, as unmarked fiber, marked fiber, and covered fiber.

Figure 1B:
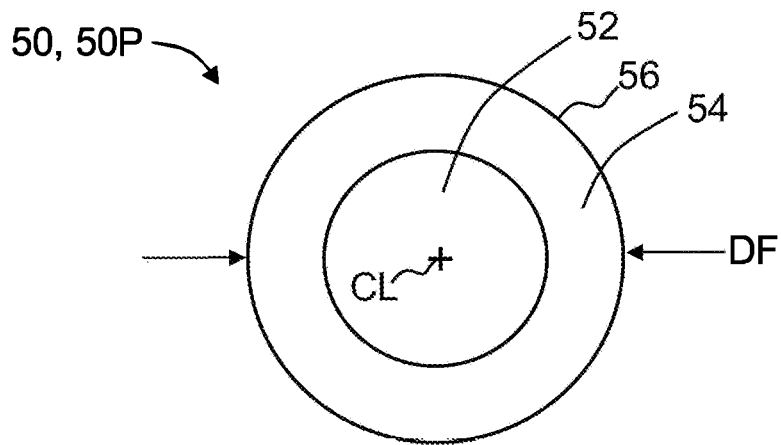
FIG. 1B is a close-up cross-sectional view of an example unmarked optical fiber.
Figure 1C:
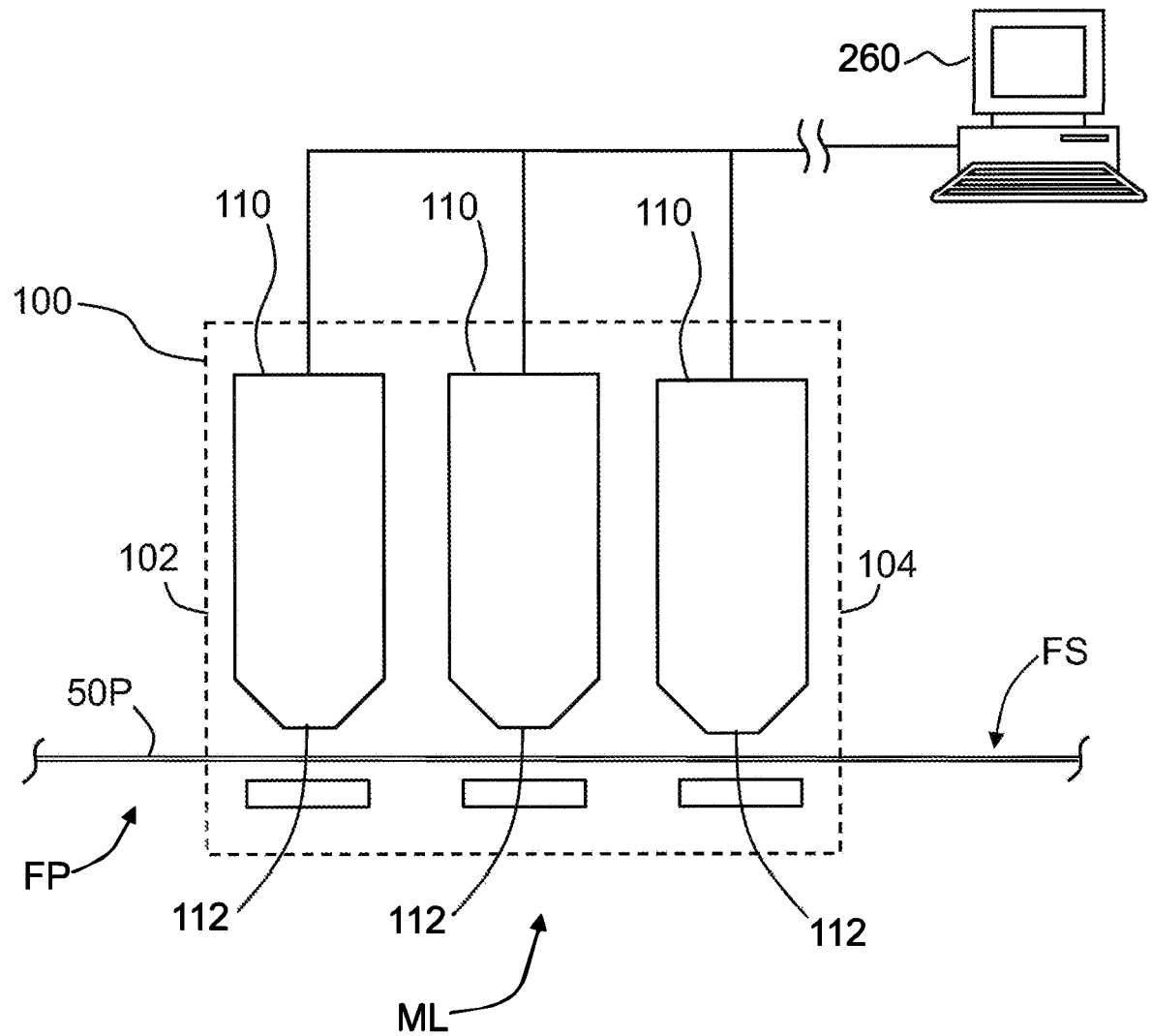
FIG. 1C is a close-up view of a marking unit of the apparatus illustrating an example where the marking unit comprises multiple ink-jet printer heads.

The unmarked section 50P of the fiber 50 is the portion of the fiber 50 upstream of marking location ML (FIG. 1C). The unmarked fiber section 50P is shown in cross-sectional view in FIG. 1B. The unmarked fiber in section 50P has a glass fiber 52 that includes a glass core and a glass cladding (not shown separately), and a coating 54 that includes one or more layers designed to prevent damage to the glass fiber 52 when the fiber 50 is handled or subjected to stress. The coating 54 is common to most optical fibers and is typically a polymer (e.g. acrylate or urethane). In a typical configuration, the coating 54 includes a low-modulus primary layer adjacent to the glass fiber 52 and a high-modulus secondary layer adjacent to the primary layer. The coating 54 has an outer surface 56, which defines the outer surface of the unmarked fiber in fiber section 50P. The fiber 50 has a centerline CL that defines an axial direction down the fiber. The coated fiber 50 has a diameter DF, which in examples can be about 125 microns or about 250 microns.

With reference again to FIG. 1A, the apparatus 10 includes at the first end 12 a payout module 20. The payout module includes a storage reel 30 that stores a length of the fiber 50 in an unmarked state. The apparatus 10 also includes at the second end 14 a take-up module 220. The take-up module 220 includes a storage reel 230 that stores the fiber 50 after it has been marked and covered by the apparatus 10, as explained below. The payout module 20 and the take-up module 220 each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in the apparatus 10. The fiber 50 has a fiber speed SF over the fiber path FP. In the example configuration of FIG. 1A, the most upstream drive pulley 36D and the first downstream guide pulley 36G define a fiber span FS that is under tension.

The apparatus 10 further includes marking unit 100 that resides downstream of the payout module 20 and upstream of the take-up module 220. The marking unit 100 is positioned along the fiber path FP (see FIGS. 1C and 2C). The marking unit 100 has an (upstream) input end 102 that receives unmarked fiber (fiber section 50P) and a (downstream) output end 104 that delivers marked fiber (fiber section 50MU) to downstream units of apparatus 10. The marking unit 100 includes at least one ink-jet printer head 110 with an output end 112 located proximate to the fiber path FP that delivers ink 114 in the form of ink droplets 115 to unmarked fiber at marking location ML. The ink droplets 115 define an ink-jet stream 115S that runs in the y-direction.

The marked section 50MU of fiber 50 is the portion of fiber 50 that is downstream from marking location ML and upstream of overcoat applicator 170. One ink-jet printer head 110 is shown for ease of illustration and explanation in FIG. 1A. FIG. 1C is a close-up view of an example marking unit 100 that includes three ink-jet printer heads 110 each operably connected to a controller 260 which is introduced and discussed below.

Figure 2A:
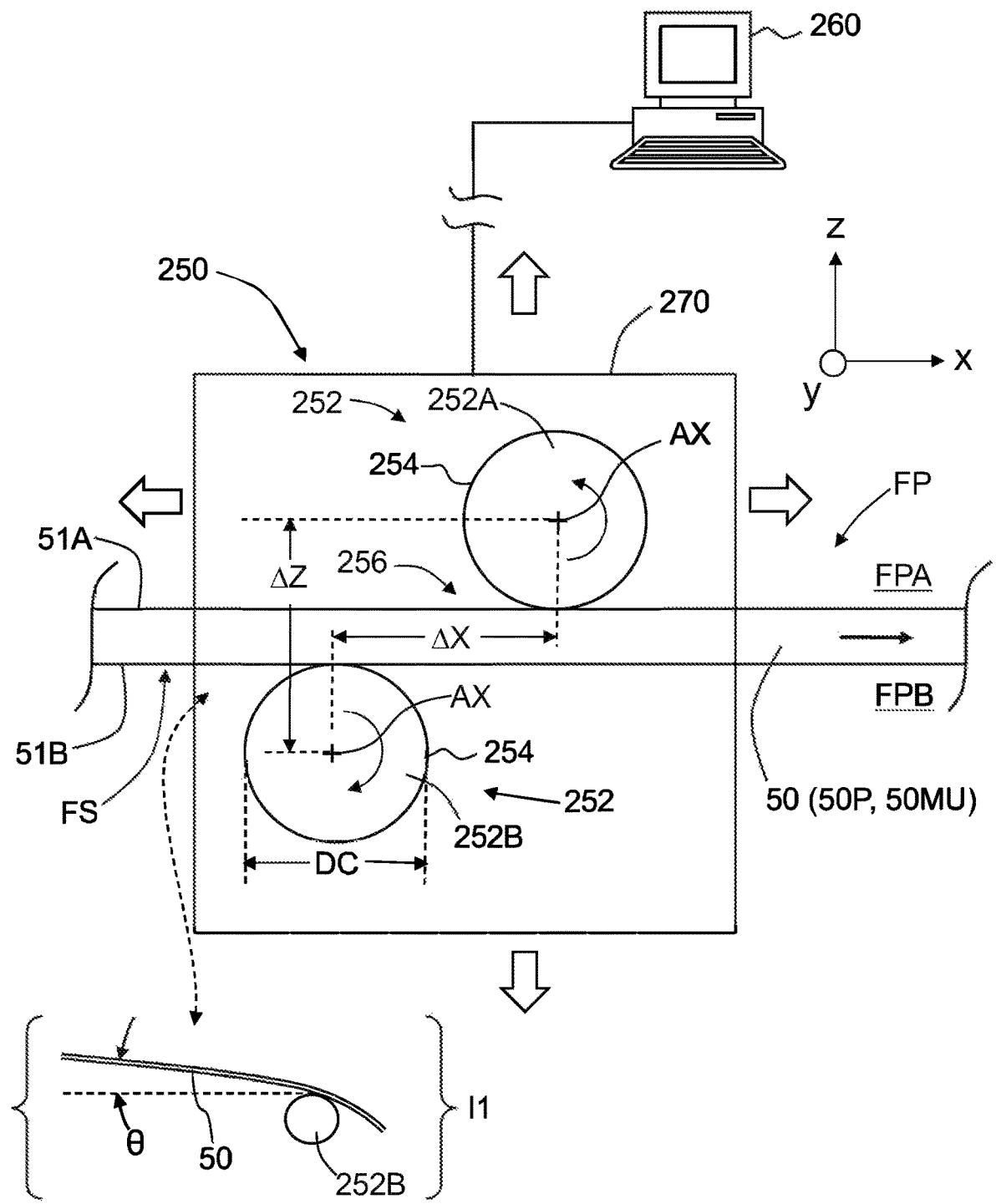
FIG. 2A is a close-up top-down view of an example fiber positioning device.
Figure 2B:
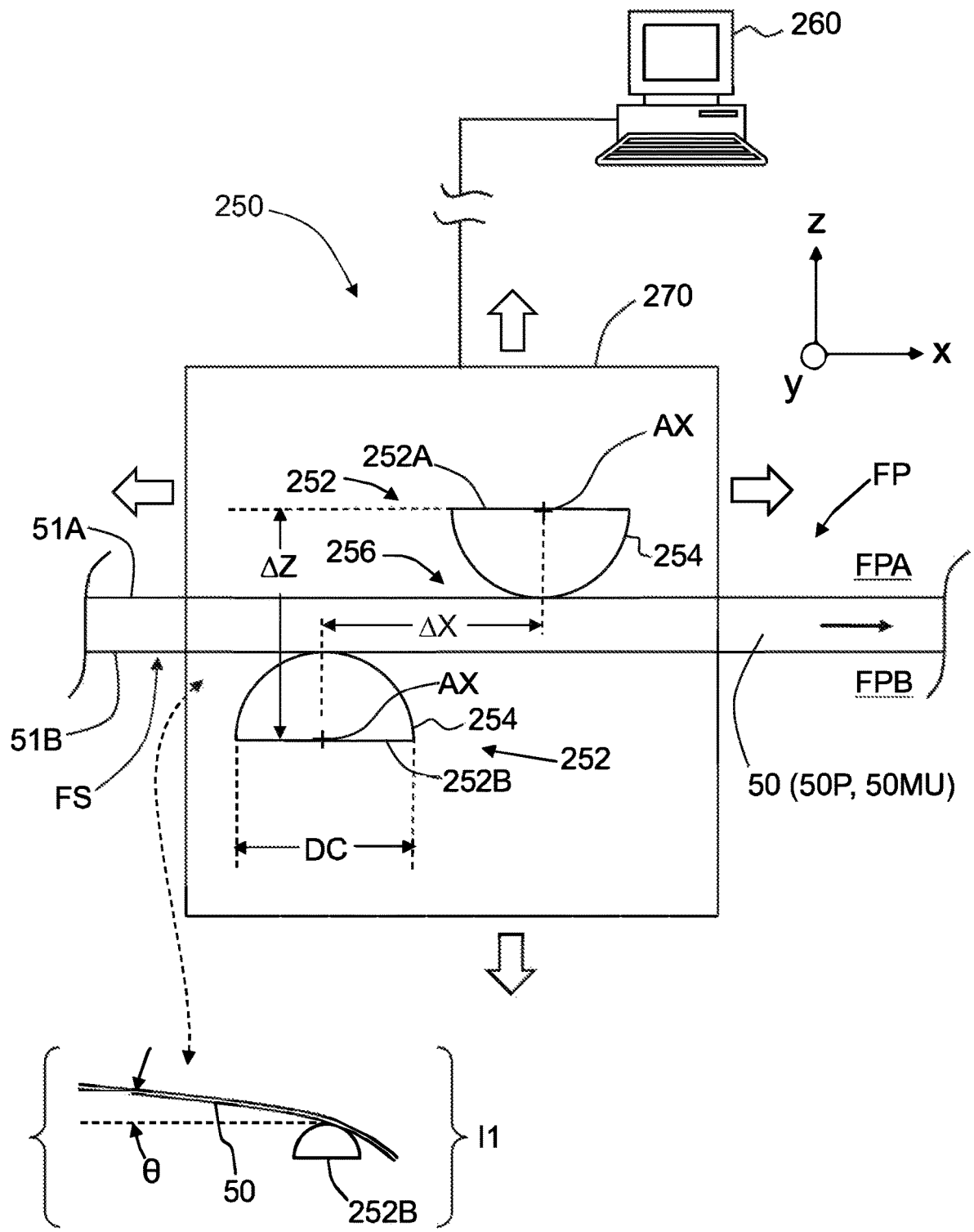
FIG. 2B is similar to FIG. 2A and shows an example where the guide members of FIG. 2A are replaced with semi-guide members that do not rotate.
Figure 2C:
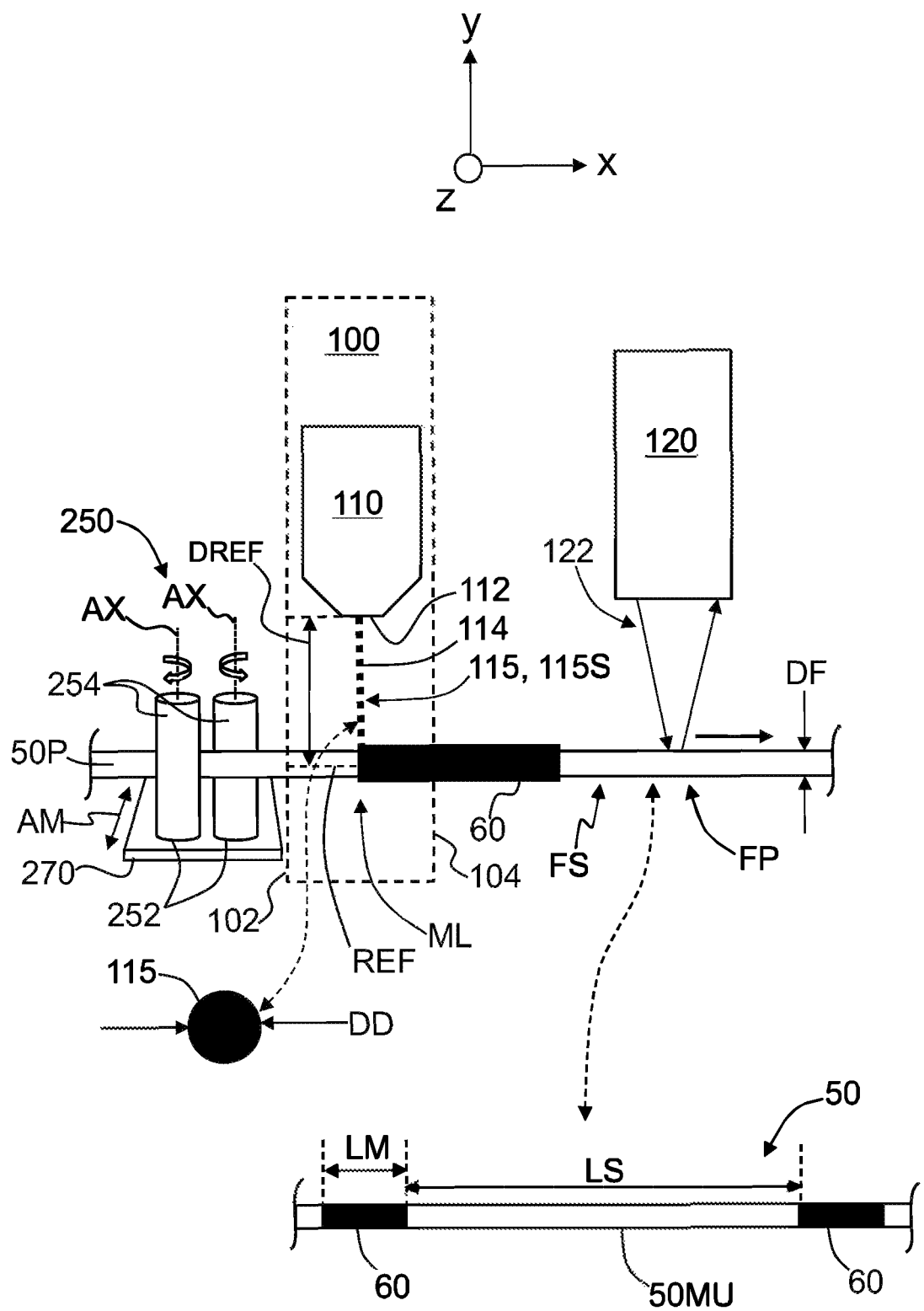
FIG. 2C is a close-up view of the apparatus showing the fiber positioning device arranged relative to the marking unit for marking the unmarked optical fiber, and a position sensor for measuring the position (vibration) of the newly marked optical fiber close to the marking unit.

A position sensor 120 resides immediately downstream of the marking unit 100 and is operably arranged relative to the fiber path FP to measure a displacement of the fiber 50 relative to a reference position REF, e.g., a nominal or ideal fiber path, which is discussed in greater detail below and an example of which is shown in FIG. 2C. In an example, the position sensor 120 is able to measure the position of the fiber 50 in the z-direction to tenths a micron. In an example, the position sensor is also configured to measure the position of the fiber 50 in the y-direction as well. In the discussion below, the z-direction is a lateral direction relative to the y-direction of the ink-jet stream 115S, and movement of the fiber 50 in the z-direction can be referred to as lateral movement and the movement increments $\delta z$ introduced and discussed below can be referred to as lateral increments.

The position sensor 120 can also reside immediately upstream of the marking unit 100 or can be arranged to measure the position of fiber 50 at the marking location ML associated with the marking unit 100, as discussed below. A dryer unit 130 resides downstream of the position sensor 120 and includes an input end 132 for receiving the marked section 50MU of the fiber 50 and an output end 134 for delivering the marked fiber in a state in which the ink 114 used to make the marks 60 has dried. The dryer unit 130 defines a drying location DL along the fiber path FP. In an example, the dryer unit 130 comprises a dryer tube 136 with an interior 138 through which the fiber path FP passes. In an example shown in FIG. 1A, a second dryer unit 130 is arranged along the fiber path FP to ensure mark drying in the case of high fiber speeds.

A mark counter 150 resides immediately downstream of the dryer unit 130 and is operably arranged relative to the fiber path FP. An overcoat applicator 170 resides downstream of the marking counter 150 and includes an input end 172 that receives the marked fiber (fiber section 50MU) and an output end 174 that delivers covered fiber (fiber section 50MC). The fiber path FP passes through the overcoat applicator 170. In an example, the overcoat applicator 170 includes a coating tube 178 with an interior 179 through which the fiber path FP passes.

A curing system 190 resides immediately downstream of the overcoat applicator 170 and has an input end 192 for receiving the covered fiber 50MC with an uncured overcoat, an output end 194 for delivering covered fiber with a cured overcoat, and an interior 195, with the fiber path FP passing through interior. The aforementioned take-up module 220 resides immediately downstream of the curing system 190 at the second (finishing) end 14 of the apparatus 100. The covered fiber section 50MC corresponds to the portion of fiber 50 downstream from the overcoat applicator 170 through the take up module 220. The combination of the overcoat applicator 170 and the curing system 190 defines a coating system 199.

The apparatus 10 also includes a fiber positioning device 250 arranged in the fiber path FP. The fiber positioning device 250 is configured to engage the fiber 50 and adjustably position the fiber 50 substantially at the marking location ML as the unmarked fiber travels through the marking unit 100. In an example, a first fiber positioning device 250U is operably disposed upstream of the marking unit 100 and within the fiber span FS between the payout module 20 and the input side 102 of the marking unit 110. The first fiber positioning device 250U is preferably disposed as close as possible to the marking unit 100, such as immediately adjacent its input side 102. A second fiber positioning device (not shown) can be operably disposed in the fiber span FS adjacent the output end 134 of the dryer unit 130.

The fiber positioning device 250 makes physical contact with the fiber 50 and is configured to position the fiber and the fiber path FP relative to the printer module 100, as described in greater detail below. Thus, the fiber positioning device 250 is contact-based by virtue of its making physical (direct) contact with the fiber 50. In an example the amount of force of the contact on the fiber 50 from the fiber positioning device 250 is enough to dampen vibrations in the fiber 50 to a suitable degree.

The apparatus 10 includes a controller 260 that is operably connected to the payout module 20, the take-up module 220, the marking unit 100 (and in particular to the one or more ink-jet printer modules 110 therein), the position sensor 120, the dryer unit 130, the mark counter 150, the overcoat applicator 170 and the curing system 190. The controller 260 is configured to control these apparatus components and the overall operation of the apparatus 10, including the speed SF of the fiber 50 through the apparatus 10 over the fiber path FP.

In an example, the controller 260 comprises a programmable logic controller (PLC) configured to carry out instructions (software, firmware, etc.) embodied in a non-transitory computer-readable medium and that cause the apparatus 10 to carry out the methods disclosed herein. The controller 260 includes a user interface, which is part of an overall human-machine interface (HMI) of the apparatus 10 that enables a user to carry out the methods disclosed herein using the apparatus 10. The HMI can include knobs, switches, buttons, levers, etc. (not shown) used to control the operation of one or more select components of the apparatus 10.

In some examples, the controller 260 need not be connected to and control some of the apparatus components that could be operated independently using non-controller-based HMI features (e.g., knobs, levers, buttons, switches, etc.). Also in an embodiment, the controller 260 can be operably connected to the fiber positioning devices 250 to control the position of the fiber 50 and the fiber path FP relative to the marking unit 100. In an example discussed in greater detail below, the fiber positioning device 250 is operably supported by a movable support stage 270 (see FIG. 2A and FIGS. 3A to 3C) that can be moved by the controller 260 to adjust the position of the fiber 50 and the fiber path FP relative to the marking unit 100.

While the fiber speed SF can be relatively slow (e.g., 0.5 m/s), the apparatus and methods disclosed herein are particularly useful for fiber speeds in excess of about 2 m/s or 5 m/s or 10 m/s, which are the speeds at which the fiber 50 starts to vibrate substantially and can result in marking errors that exceed a reasonable marking error tolerance. In an example, apparatus and methods disclosed herein preferably operate at fiber speeds SF of greater than 2 m/s, or greater than 5 m/s or 10 m/s or greater, and up to the maximum fiber speed of the apparatus 10, which in an example is about 25 m/s.

Fiber Positioning Device

FIG. 2A is a close-up top-down view of an example fiber positioning device 250. The fiber 50 is operably arranged therein along the fiber path FP, with the fiber having first and second opposite sides 51A and 51B for reference. Fiber 50 enters fiber positioning device 250 as either unmarked fiber of fiber section 50P or marked fiber of fiber section 50MU.

In an example, the fiber positioning device 250 includes one or more guide members 252. In the examples discussed below, two guide members 252 are used, denoted 252A and 252B in some of the Figures. Each guide member 252 has an outer surface 254 and further in an example includes a central (long) axis $AX$ that runs in the y-direction. In an example, the guide members 252A and 252B are cylindrical and have parallel central axes $AX$. The guide members 252A and 252B are offset from one another in the z-direction by a z-offset $\Delta Z$ and in the x-direction by an x-offset $\Delta X$, wherein the two offsets are measured with respect to the central axes $AX$. In FIG. 2A, the fiber path FP is shown as having first and second opposite sides FPA and FPB. The configuration of the fiber positioning device 250 employing two guide members 252 and as described in detail below facilitates damping vibration of the fiber 50 as is moves over the fiber path FP.

The z-offset is selected such that that the first and second guide members 252A and 252B can respectively reside on the first and second sides FPA and FPB of the fiber path FP and thus respectively adjacent and in contact with the first and second opposite sides 51A and 51B of the fiber 50. The spaced apart guide members 252A and 252B define a guide member gap 256 through which the fiber 50 passes. The first and second sides 51A and 51B of the fiber 50 respectively contact the outer surfaces 254 of the first and second guide members 252A and 252B as the fiber 50 passes through the guide member gap 256. In an example of this configuration, the two guide members 252A and 252B can counter-rotate, i.e., have opposite rotation directions about their respective central axes $AX$. In an example, the guide members 252A and 252B can be fabricated such that their outer surfaces comprise a hard, low-friction material, such as alumina. In some embodiments, the guide members 252A and 252B are rotatable but the fiber 50 only grazes the two guide members so that they may not experience enough frictional force from the fiber to force their rotation. In some embodiments such as shown in FIG. 2B, the guide members 252A and 252B can be fixed, i.e., non-rotatable, or they can be only partially rotatable. In the example embodiment of FIG. 2B, the guide members 252A and 252B are shown as semi-circular cylinders but can also be quarter-circular cylinders or have a geometry where the outer surface 254 varies only in one direction in the general region where the fiber 50 contacts the guide members 252A and 252B (e.g., the outer surface has a cylindrical portion).

In the examples of FIG. 2A and FIG. 2B, the fiber 50 is shown as being straight, but the fiber 50 can also follow a slightly bent fiber path FP through the guide members 252A and 252B by adjusting (decreasing) the z-offset $\Delta Z$ of the two guide members. In an example, the guide members 252 have the same diameter DC, and in an example the z-offset $\Delta Z$ is about equal to the diameter DC to ensure that the fiber 50 makes tangential or grazing contact with the outer surfaces 254 of the two guide members 252A and 252B. In one example, the contact angle θ that the fiber 50 makes with the outer surface 254 of the guide members 252 (and that measures a change in direction of the fiber) is less than 0.1 degree (see insets 11 of FIGS. 2A and 2B). Also in an example, the x-offset ΔX can be up to about twice the diameter DC. An example diameter DC for the first and second guide members 252A and 252B is 1 inch, though other diameters can be effectively employed.

Figure 3A:
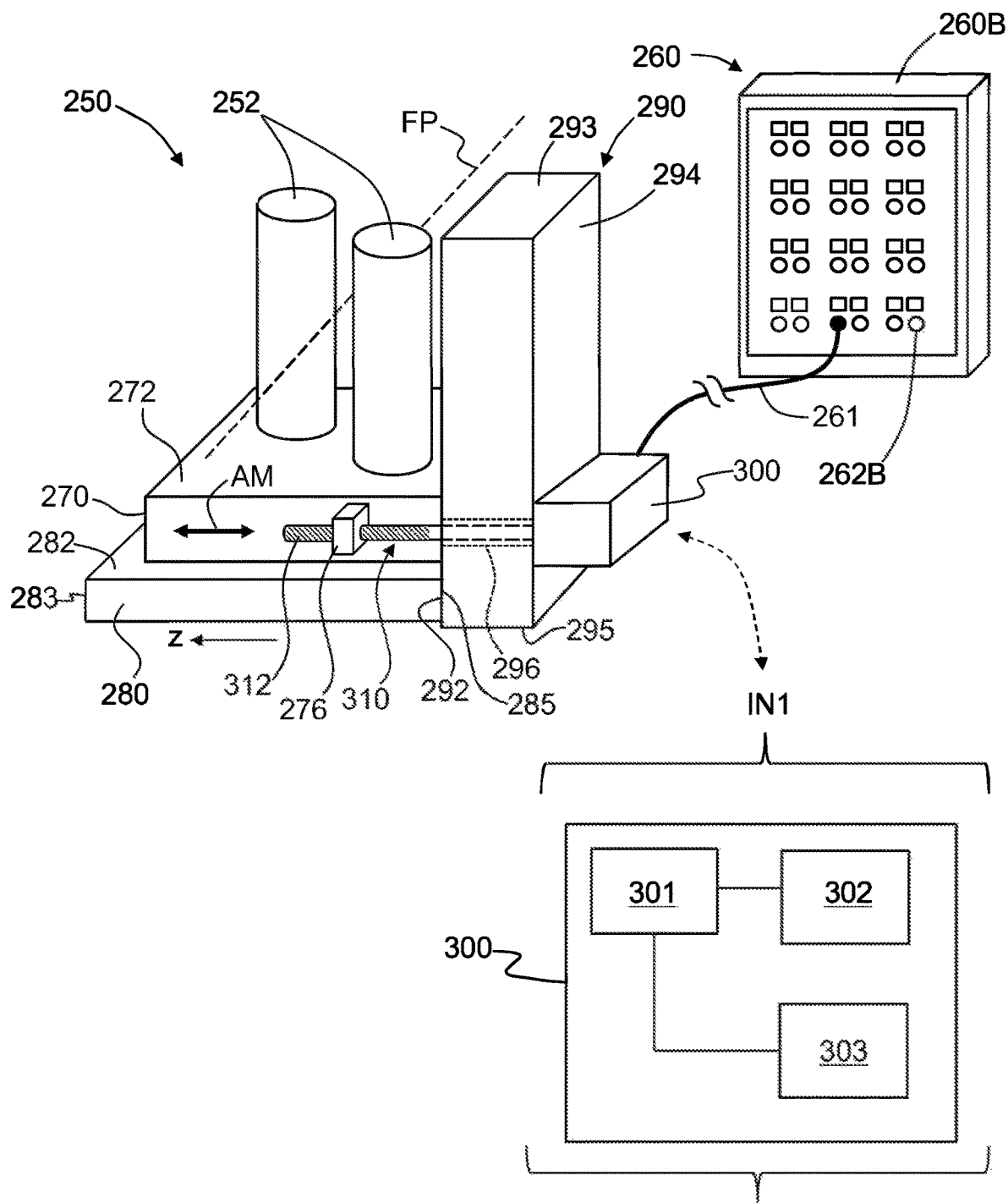
FIG. 3A is an elevated view of an example fiber positioning device.
Figure 3B:
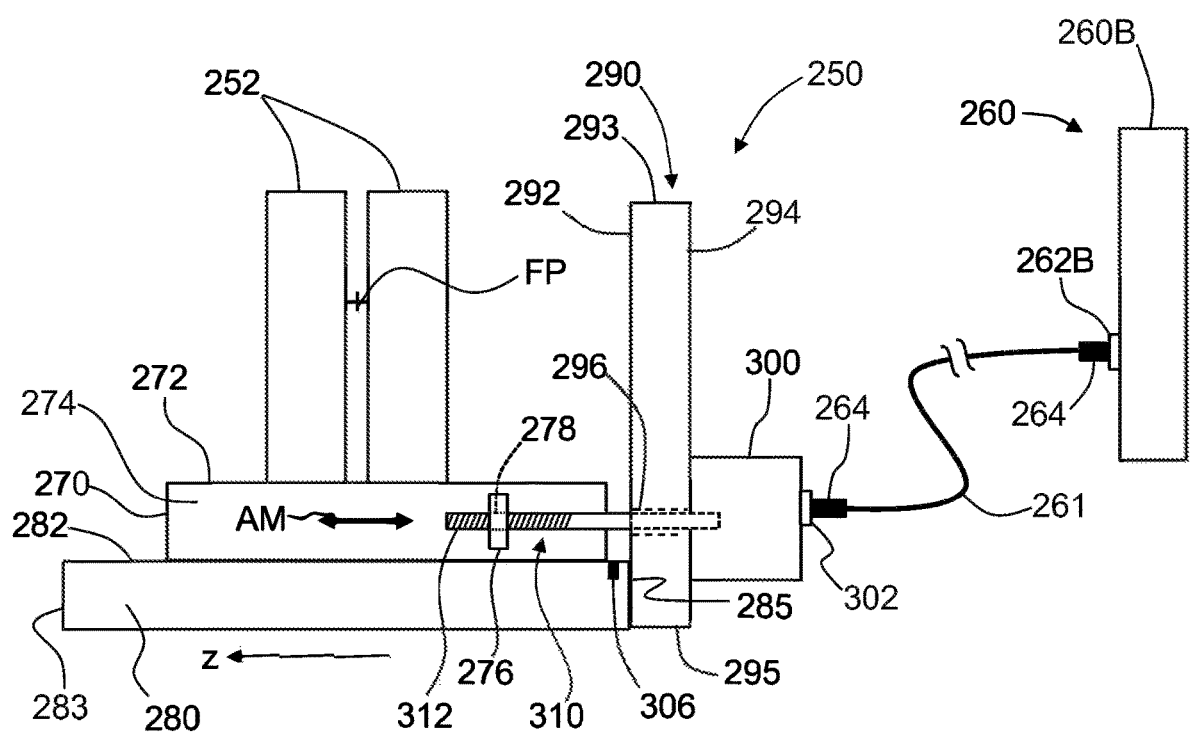
FIG. 3B is a side view of the example fiber positioning device of FIG. 3A.
Figure 3C:
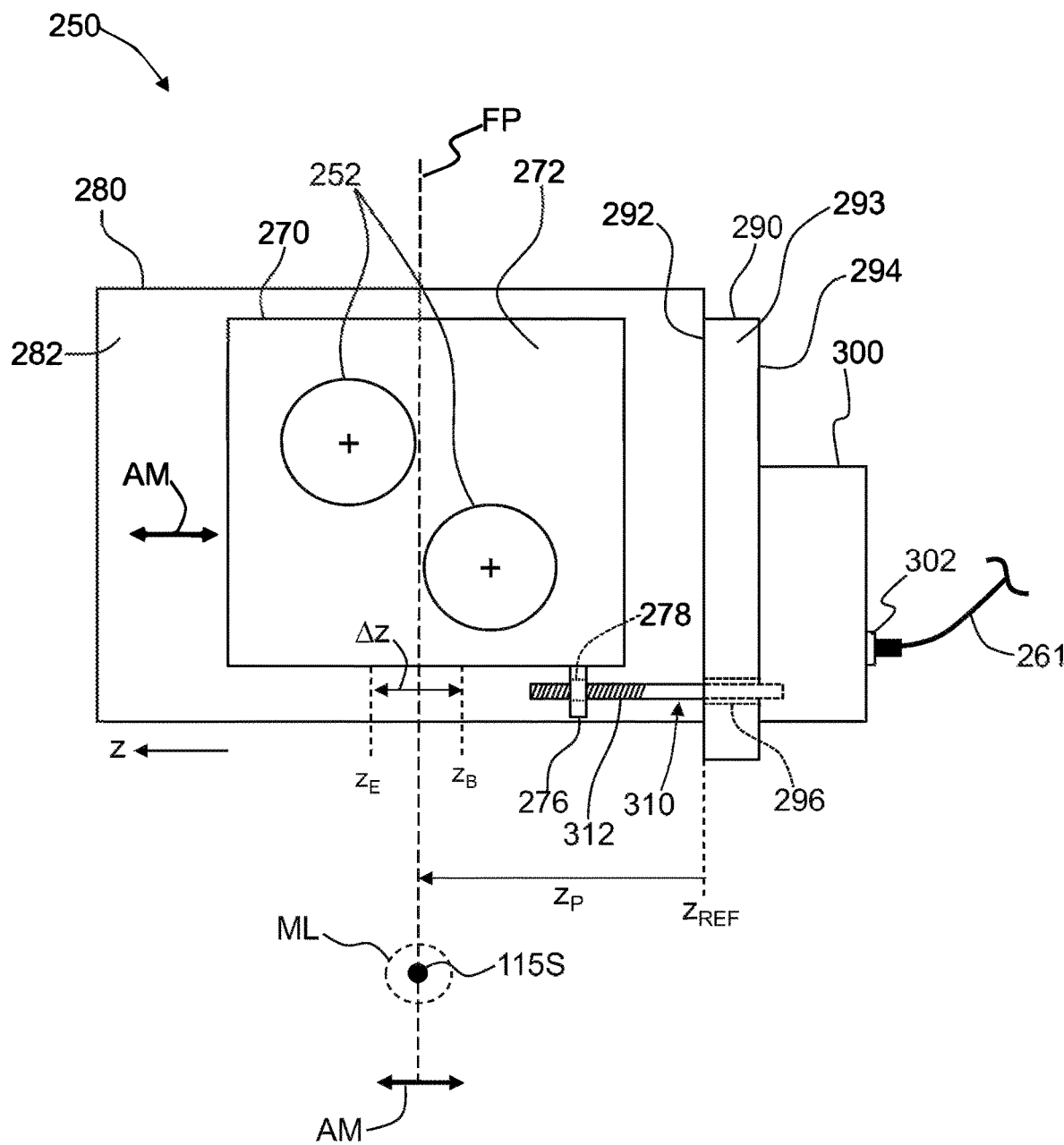
FIG. 3C is a top-down view of the example fiber positioning device of FIGS. 3A and 3B.

FIG. 3A is an elevated view of an example fiber positioning device 250, while FIG. 3B is a side view and FIG. 3C is a top-down view of the example fiber positioning device. The fiber positioning device 250 includes the cylindrical guide members 252 supported on an upper surface 272 of the movable support stage 270. The movable support stage 270 also has a side 274 that includes a side member 276 having a threaded hole 278. In an example, the side member 276 can be an added-on component or can be integral with the body of the movable support stage.

The movable support stage 270 is movably supported by a support base 280 having a top surface 282 and opposite (front and back) ends 283 and 285. In an example, the movable support stage 270 is supported on the support base 280 by bearings (not shown). The movement of the movable support stage 270 in the z-direction is shown by a movement arrow AM.

The example fiber positioning device 250 also includes a mounting plate 290 having opposite (front and back) sides 292 and 294, a top end 293 and a bottom end 295. The mounting plate 290 is attached to the back end 295 of the support base 280 at or near the bottom end 295 of the mounting plate. A drive motor 300 is mounted to the back side 294 of the mounting plate 290. As shown in the close-up inset IN1 of FIG. 3A, an example drive motor 300 comprises a drive controller 301, a stepper motor 302 and an encoder 303. Such driver motors 300 are known in the art and are commercially available.

Figure 3D:
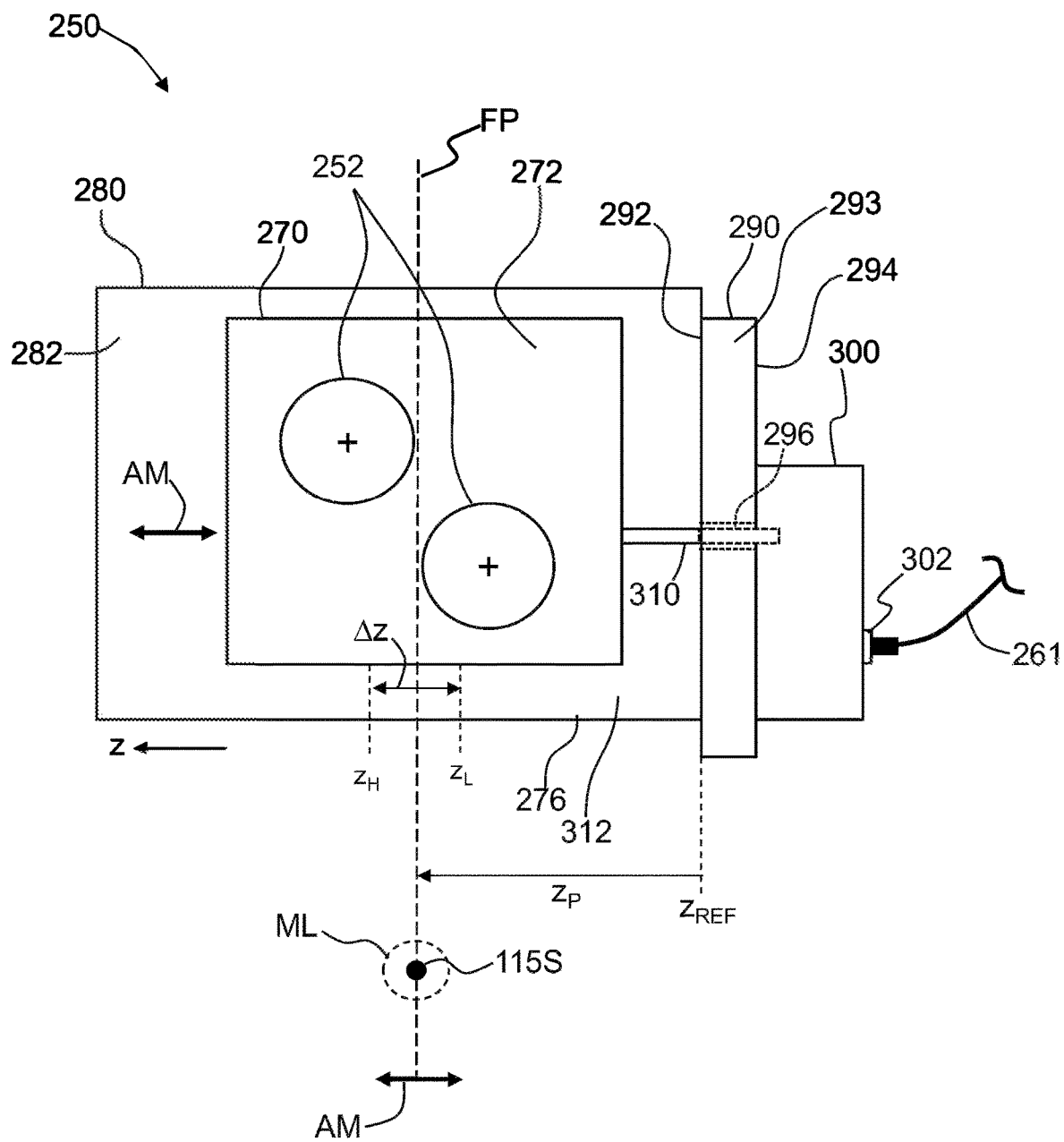
FIG. 3D is similar to FIG. 3C and illustrates an example where the drive shaft moves axially rather than rotating.

The drive motor 300 includes drive shaft 310 that runs in the z-direction and passes through a hole 296 in the mounting plate 290. In the example of FIGS. 3A through 3C, the drive shaft 310 is rotatable and includes a threaded end section 312 that operably engages the threaded hole 278 of the side member 276. In another embodiment illustrated in FIG. 3D, the drive shaft 310 is axially translatable and is mechanically attached to either the side member 276 or directly to the movable support stage 270, as shown. In this embodiment, the drive motor 300 can comprise a piezo-electric actuator.

The drive motor 300 is electrically connected to a back plane 260B of the controller 260 via an electrical cable 261 having connectorized ends 264. One of the connectorized ends operably engages a connector port 262B on the back plane 260B while the other engages a connector port 302 on the drive motor. The wires (not shown) of the electrical cable 261 may also be attached directly to leads (not shown) in the drive motor 300. A single electrical cable 261 is shown by way of illustration and more than one electrical cable may be employed depending on the type of drive motor 300 used. In an example, the threaded end section 312 of the drive shaft 310 and the complementary threaded side member 276 are configured to provide between 0.5 mm and 1 mm of movement of the movable support stage 270 per one rotation of the drive shaft 310. Fractional amounts of rotation can be used to define precision movement increments δz in the z-direction. In the embodiment where the drive shaft 310 is linearly translatable, the drive motor 300 is used to linearly translate the drive shaft 310 (and thus the movable support stage 270) by precision increments δz. In either embodiment, an example range on the precision movement increment δz is in the range from 0.1 to 10 micron or 0.2 micron to 5 microns. Other increment ranges for the movement increment δz are available and can be effectively employed, depending on the type of drive motor 300 used, and the example range set forth above is one example that can serve most purposes. An example stepper motor is the model AS1020 stepper motor from Beckhoff Automation LLC, Savage, Minn.

With reference to FIG. 3C, the z-position $z_P$ of the fiber path FP defined by the guide members 252 is measured with respect to a reference position $z_{REF}$, which can be defined as $z_{REF}=0$. The movement of the movable support stage 270 occurs over a range $\Delta z = z_E - z_B$, where $z_E$ is the maximum or far end of the range of $z_P$ and $z_B$ is the minimum or beginning (near end) of the range of $z_P$. The different z-positions $z_P$ are measurement positions are defined by precision increments δz start from $z_P = z_B$ and reside within the range Δz, including the end points z B and $z_E$. Thus, the method includes sequentially placing the fiber 50 at different measurement positions $z_P$ over the range Δz of measurement positions, wherein multiple ones of the measurement positions $z_P$ cause the optical fiber to intersect the ink-jet stream 115S to form marks 60 on the outer surface 56 of the fiber. Note that in an example, some of the measurement positions $z_P$ can result in no marks 60 being formed on the fiber.

As noted above, with an ink droplet diameter DD on the order of 50 μm and a fiber diameter DF on the order of 125 μm or 250 μm, the process window for producing on the fiber 50 the target number density $N_T$ of marks 60 with high accuracy (i.e., minimum marking errors) is relatively small, e.g., the tolerance on the z-position $z_P$ of the fiber path is in the range from 20 μm to 60 μm from perfect (ideal) alignment with the stream of ink droplets 115.

Centering the Fiber Path to the Ink-Jet Stream

An aspect of the disclosure is directed to a method of centering the fiber path FP relative to the ink-jet stream 115S. This is referred to hereinafter as the centering method. An example centering method relies on measuring two main parameters, namely the z-position or measurement position $z_P$ of the fiber 50 and the measured mark number density $N_M$. In an example, operational parameters for the apparatus 10 are inputted into the controller 260 via the user interface as well as via manual controls of the HMI to move the fiber 50 into a desired position. The HMI can include a homing function that clears and re-sets the drive motor position (e.g., stepper encoder position), an automatic centering process, and an apparatus settings update process.

Figure 4A:
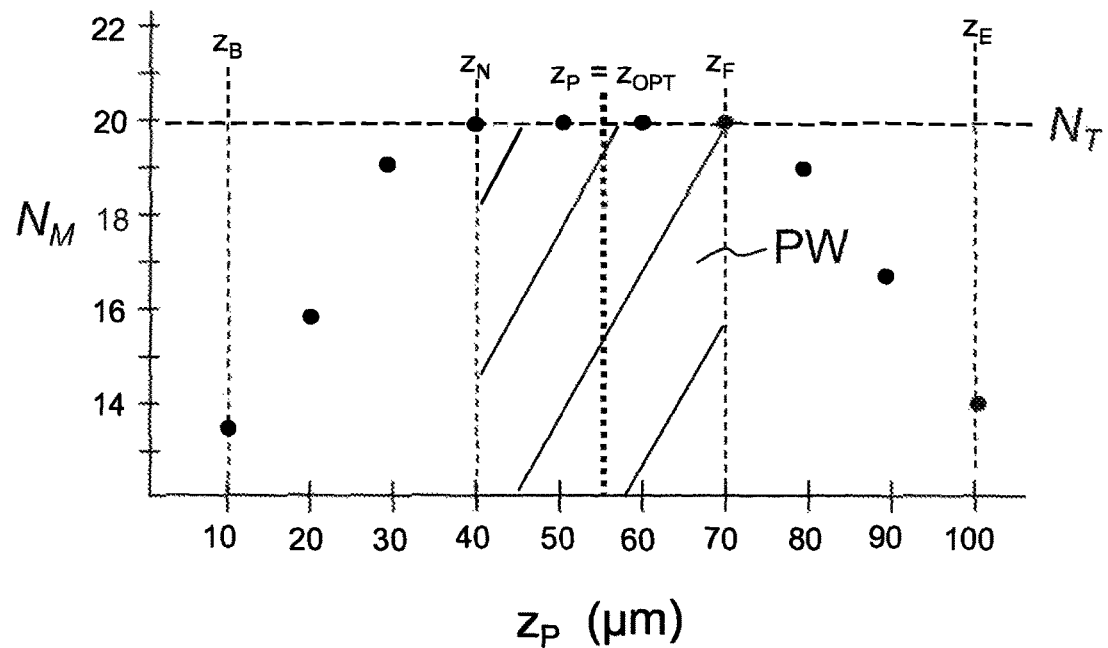
FIG. 4A is a plot of the measured mark number density $N_M$ (marks/meter) versus the z-position $z_P$ (microns, μm) of the fiber and illustrates an example process window for marking the fiber as determined using the methods disclosed herein based on a target mark number density $N_T=20$.

The general centering method includes performing the fiber marking operation while adjusting the measurement position $z_P$ of the fiber 50 and for each measurement position $z_P$ ($z_1, z_2, z_3, \ldots z_n$) measuring the mark number density $N_M$ and comparing it to a target number density $N_T$. This forms a set SM of mark number densities, i.e., $S_M = \{N_{M1}, N_{M2}, N_{M3}, \ldots N_{Mn}\}$. FIG. 4A is an example plot of the measured mark number density $N_M$ (marks/meter) versus the measurement position $z_P$ (μm). The plot shows that as measurement position $z_P$ increases from the beginning value $z_B$, the measured mark number density $N_M$ reaches the target mark number density $N_T$ at a first (near) z-position denoted $z_N$ ("z near") and remains constant until the z-position reaches a second (far) z-position denoted $z_F$ ("z far"), at which point the measured mark number density $N_M$ decreases as the measurement position increases and approaches the end position $z_E$.

The range of measurement positions from $z_N$ to $z_F$ defines an example process window PW over which the apparatus 10 can form marks 60 at the target number density $N_T$ with high accuracy. In an example, the z-position of the fiber is set in apparatus 10 to be $z_{OPT}=(z_N+z_F)/2$, i.e., midway (or substantially midway, e.g., within ±20% of midway) between $z_N$ and $z_F$ for marking the fiber 50. The operation of the apparatus 10 can be monitored by continuing to measure the fiber z-position $z_P$ and the measured mark number density $N_M$ and to compensate for any drift in the system operation by adjusting the z-position. The portion of the method that finds the process window PW and then sets an optimum z-position $z_{OPT}$ can be thought of as a calibration mode while the portion of the method for forming marks on the fiber 50 while the fiber is at $z_P=z_{OPT}$ can be thought of as a fabrication or production mode.

Method Parameters

A useful method parameter is the last-known-good position $z_{LNG}$, which is the z-position where marks 60 were most recently formed that met the target mark number density $N_T$ of marks. The last-known-good position $z_{LNG}$ can be used to define the starting z-position $z_B$ for collecting measurement data, i.e., the measured number density of marks 60. The last-known-good position $z_{LNG}$ can be stored in the controller 260 based on previous marking runs.

Another useful method parameter is the back-off distance $z_{BO}$, which is a distance one chooses to move away from or "back off" from the last-known-good position $z_{LNG}$ prior to data collection (i.e., measuring the mark density $N_M$ as a function of fiber z-position $z_P$) to define the start or beginning position $z_B$. The back-off distance $z_{BO}$ can also be used as the distance by which the last-known-good position is surpassed to define the end position $z_E$. Thus, in an example, the range of the z-position $z_P$ from the starting position $z_B$ to the stopping position $z_E$ can be twice the back off distance $z_{BO}$.

Other useful parameters include the movement increment $\delta z$, the measured number density $N_M$ and the target mark number density $N_T$. A mark number density deviation or tolerance $\Delta N$ is the allowed amount of marks/length (e.g., marks/meter) above or below the target mark number density $N_T$. Thus, in an example, the process window need not be defined only by the target mark number density $N_T$ as shown in FIG. 4A, but can be defined by further including the mark number density tolerance $\Delta N$ on the target mark number density $N_T$, i.e., $N_T \pm \Delta N$. This establishes a range $R=N_T \pm \Delta N$ for the mark number density rather than being limited to a single value. Note that when $\Delta N=0$, the range R reduces to the special case of just the target number density $N_T$. The range R is also referred to below as the target mark number density range.

Figure 4B:
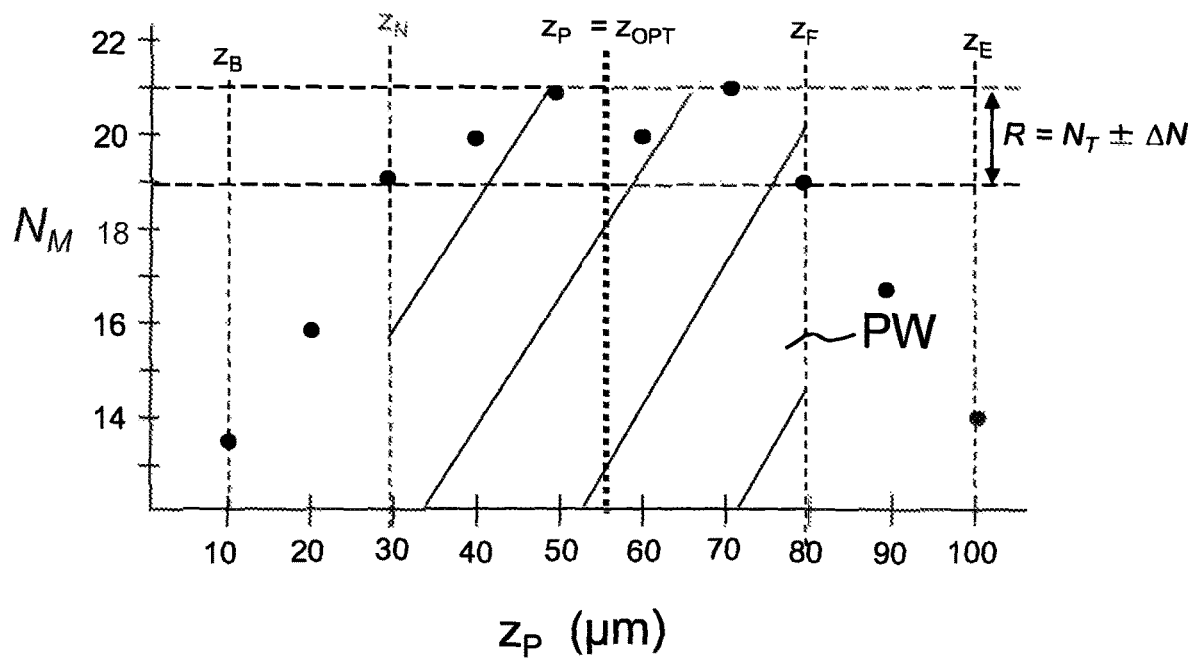
FIG. 4B is similar to FIG. 4A but shows an example process window for marking the fiber as determined using the methods disclosed herein based on a target mark number density $N_T=20$ and a mark number density tolerance $\Delta N=1$ mark/meter.

In an example where $\Delta N=1$ mark/meter and the target mark number density $N_T=20$ marks/meter, an acceptable target mark number density range R is from 19 to 21 marks/meter (inclusive). This results in a larger process window, as shown in the example process window plotted in FIG. 4B.

The method can include a homing function wherein the drive motor position (e.g., as represented by a value stored in the encoder 303) is reset to a known fixed position and aligned with the value of the position for the measured fiber position. The encoder position is used internally by the drive controller 301. Keeping the drive motor 300 "homed" maintains a valid range of values in the position register of the encoder 303 and prevents drive faults or problems in the event of invalid values.

The homing function can be manually initiated from the HMI, or it can be automatically executed at the beginning of the centering method. The homing process is used when the fiber 50 is operably arranged in the apparatus 10 (e.g., under typical operating tension and fiber speed), such that a valid fiber position is read by the position sensor 120.

The homing process involves moving the movable stage 270 toward a home proximity switch 306 located at the closest z-position of the range of motion of the movable stage and electrically connected to the controller 260. When the home proximity switch is triggered (high), the controller software zeroes out the encoder value, and then initiates the movement of the movable stage 270 away from the proximity switch 306 until the signal is no longer triggered (low). The controller software then measures the actual fiber position, and sets the encoder value equal to the measured fiber position. The homing function then moves the movable stage 270 to place the fiber 50 at the last-known-good position $z_{LNG}$.

In an example of carrying out the centering method, a user can enter the following operational parameters into apparatus 10 via the HMI: 1) The last-known-good fiber position $z_{LNG}$ for achieving the desired target number density $N_T$; 2) the back-off distance $z_{BO}$; 3) movement increment $\delta z$; 4) target mark number density $N_T$; and 5) the mark number density tolerance $\Delta N$.

The fiber 50 is then placed at the last-known-good fiber position $z_{LNG}$ (e.g, using the homing method described above).

The method includes moving the fiber 50 away from the last-known-good fiber position $z_{LNG}$ by the back-off distance $z_{BO}$ to the starting (beginning) position $z_B$. The marking process is then initiated. The measured mark number density $N_M$ is determined by the mark counter 150 while the fiber z-position $z_P$ is measured by the position sensor 120. The marking process is carried out for the starting z-position $z_B$ to obtain a sufficient sample of marks, e.g., between 10 meters and 1000 meters worth of marked fiber. The measured mark number densities $N_M$ for $z_P=z_B$ are then examined. In an example, an average value of the measured mark number densities $N_M$ for select lengths of the marked fiber is calculated and compared to the target mark number density $N_T$. In another example, the mark number density for each 1 meter section of the marked fiber is determined and compared to the target mark number density $N_T$ and optionally the mark number density tolerance $\Delta N$ if applicable. It may be that at the starting position $z_B$, no marks 60 are formed on the fiber 50 because the ink-jet stream 115S completely misses the fiber.

The z-position of the fiber 10 is then changed from the starting (beginning) position $z_B$ by the movement increment $\delta z$ and the above process repeated until the z-position reaches the ending position $z_E$.

As the fiber 50 approaches the optimal marking position, the ink-jet stream 115S begins to be incident upon the edge of the fiber, and the measured mark number density $N_M$ increases. Optimal (i.e., the most accurate) fiber marking occurs when the fiber 50 is centered directly beneath the ink-jet stream 115S. As the fiber 50 is moved farther away from its centered (optimal) z-position, the ink-jet stream 115S is incident upon the opposite edge of the fiber and the measured mark number density $N_M$ eventually decreases and at some point, the ink-jet stream 115S misses the fiber 50 and no marks 60 are formed on the fiber.

The collected measurement data is then processed to determine the process window PW (e.g., per FIG. 4A or 4B), and the z-position $z_P$ set to reside within the process window, e.g., in the middle of the process window at the $z_P=z_{OPT}$ position. This becomes the new best-known-good z-position $z_{LNG}$. If no process window is found, then the process is repeated either from a new starting position or from the same starting position but using a larger process window by selecting a larger back-off distance (e.g. double the Δz process window).

In an example, the controller software is configured to process the measurement data and determine the near and far z-positions $z_N$ and $z_F$ that establish the z-position limits on the process window PW.

Details of the Centering Process

The homing function is executed to completion, moving the fiber to the Home proximity switch and back to the Last Known Good Printing position. The process then moves the slide (reverse) to back the fiber away from the current position by the amount of (Back Off Distance) in microns. The slide is stopped, and measurements of Rings Per Meter are stored into an array. When the array is completely populated, it is processed to obtain an average value of rings per meter obtained at this particular fiber position. Comparisons are made in logic to determine if the mark number density $N_M$ ("rings per meter) value at this position constitutes a rising transition into a good "window" of printing performance, or a falling edge out of a good "window" of printing performance. When the software detects the low position $z_L$ and the high position $z_H$, then these positions and the measured mark number densities $N_M$ are stored in memory for final positioning calculations.

In an example, the back-off distance $z_{BO}$ is between 50 and 150 microns, with 100 microns being an exemplary value. A back-off distance $z_{BO}$ of 100 microns and a movement increment δz of 10 microns over a range of $2 \cdot z_{BO} = 200$ microns gives 21 z-positions $z_P$ and thus 21 sets of mark number density measurements $N_M$.

While the drive motor is configured to track the fiber's z-position $z_P$ (e.g., via the combination of a stepper motor and an integrated encoder), in one example the fiber's z-positions $z_P$ used in the centering method (including defining the marking process window PW) are based on measurements of the fiber position made the position sensor 120. This is because the position sensor 120 directly measures the fiber's actual z-position rather than relying on indirect information based on mechanical coupling and repeatability of the drive motor through mechanical couplings, linkages, screws, backlash, barrel constraints, and other physical components and effects.

Apparatus Set Up

With continuing reference to FIG. 1A, as part of the setting up of apparatus 10, the storage reel 30 with the unmarked fiber (fiber section 50P) is loaded into the payout module 20. The unmarked fiber is then fed through the nearby drive pulley 36D and through the first fiber positioning device 250U. As discussed above, the fiber positioning unit 250 is configured so that the fiber 50 resides within the process window PW and preferably at the optimal marking position $z_F = z_{OPT}$ as determined using the centering methods described above.

With reference also to FIG. 2C as well as to FIG. 1A, the unmarked fiber is led over the fiber path FP through the marking unit 100 and then passed to the position sensor 120 and through the interior 138 of the dryer unit 130. The marked fiber (fiber section 50MU) is then led around the guide pulleys 36G that reside downstream of the position sensor 120. The marked fiber is then led under the mark counter 150, through the overcoat applicator 170 and then through the curing system 190. FIG. 2C is a close-up view of the apparatus 10 showing fiber positioning device 250, the marking unit 100 and the position sensor 120 in an exemplary configuration.

The covered fiber (fiber section 50MC) is then led around the drive pulley 36D of the take-up module 220 and onto the take-up reel 230.

Method of Operation

Once the fiber 50 is set up to travel over the fiber path FP through the apparatus 10 and its various components as described above, the controller 260 activates the drive pulleys 36D of the payout module 20 and the take-up module 220 to start moving the fiber 50 along the fiber path at a select speed SF.

Once the fiber 50 ramps up to the select fiber speed SF, the controller 260 activates the marking unit 100. With reference to FIG. 2C, this includes causing the ink-jet printer head 110 to dispense from its output end 112 ink-jet-printer ink ("ink") 114. The dispensed ink 114 forms an ink stream 115 that is directed to the outer surface 56 of the unmarked fiber at marking location ML as the unmarked fiber passes below the ink-jet printer head 110 while traveling at the fiber speed SF. In an example, the ink 114 includes a pigment and a solvent such as methylethylketone (MEK).

Also in an example, the ink 114 is dispensed in ink droplets 115 having a droplet diameter DD of between 40 μm and 80 μm. The use of such relatively small ink droplets 115 provides certain advantages. First, small ink droplets 115 can have a greater velocity leaving the ink-jet printer head 110 than larger droplets, which translates into faster marking. The small ink droplets 115 also provide greater marking resolution and marking control than larger droplets. The use of small ink droplets 115 also saves ink and is therefore more economical.

The ink 114 is dispensed for a brief time interval $\Delta t_D$ so that the ink defines a mark 60 having an axial length LM (i.e., a length in the x-direction or in the direction of the fiber centerline CL) of $LM = \Delta t_D \cdot SF$. In an example, the axial length LM of the marks 60 is in the range between 1 mm and 5 mm. The mark 60 can be in the form of a ring that extends all of the way around the fiber circumference (closed ring), or at least more than halfway around the fiber circumference (e.g., >180 degrees or even >220 degrees) (open ring) (see e.g., FIGS. 6A and 6B, introduced and discussed below). The extent to which a mark 60 extends around the fiber circumference generally depends on the surface tension of the ink 114 and the wettability of the outer surface 56 of the unmarked fiber. The fiber surface conditions and the properties of the ink 114 are generally conducive for depositing the ink on just one side of the fiber 50 while still being able to form a ring-type mark 60. The marks 60 are wet ink marks when initially formed on the fiber 50 and are dried downstream as described below.

The controller 260 controls a time interval $\Delta t_1$ between activation of the ink-jet printer head 110 so that the marks 60 are axially spaced part (i.e., in the x-direction) by a mark spacing LS. In an example, the mark spacing LS between the marks 60 is in the range between 25 mm and 500 mm, or 50 mm to 250 mm, with the spacing of 250 mm being suitable for fibers used in submarine cables. In an example, the number density N is between 1 and 40 marks per meter, or between 2 and 20 marks per meter, or between 3 and 10 marks per meter, or between 3 and 7 marks per meter.

As noted above, position sensor 120 can be arranged so that it measures the position of the fiber 50 at the marking location ML. This can be done in one example by temporarily replacing the marking unit 100 with the position sensor 120 and running the apparatus 10 at the fiber speed FS to be used for fiber marking. In other cases, it may be more convenient to locate the position sensor 120 so that it measures the position of the fiber 50 close to and not directly at the marking location ML to avoid interfering with the marking process. In an example, the position sensor 120 can arranged to measure the position of the fiber 50 a few inches (e.g., 2" to 4") offset from the marking location ML along the fiber path FP. This position measurement offset is sufficiently accurate for measuring or at least closely estimating the displacement at the marking location ML when the fiber span is tens of inches long (e.g., the offset is 10% or less of the total fiber span). Of course, the position sensor location preferably avoids measuring the fiber position at a vibrational node for the largest amplitude vibrational modes.

Once the ink 114 is deposited on the unmarked fiber to form the mark 60, the ink needs to be dried so that the mark 60 becomes substantially permanent. This is accomplished by passing the marked fiber exiting the marking unit 100 at the output end 104 through the interior 138 of the dryer tube 136 of the dryer unit 130. In one example, the dryer unit 130 is configured to flow hot air through the interior 138 of the dryer tube 136 to dry the ink 114 that forms the mark 60. In a particular example, the hot air flashes off substantially all of the MEK (or other solvent) from the ink 114 to leave pigment on the outer surface 56. Evaporation of the solvent improves the adhesion between the mark 60 and the outer surface 56. The mark 60 has a thickness THM (see FIG. 5A), which in an example is in the range from 350 nm to 800 nm, depending in part on the characteristic (e.g., transparency and color) of the overcoat used to cover the marks, as introduced and discussed below. The dryer unit 130 is not limited to an air-based dryer and in other examples the drying can be accomplished using other means, such as microwaves, infrared radiation, ultraviolet radiation, convected hot air, etc.

With reference again to FIG. 1A and to FIG. 2C, the marked fiber (fiber section 50MU) exits the output end 134 of the dryer unit 130. The marked fiber then passes by the marking counter 150, which counts the number of marks, e.g., as a measured number density $N_M$. The measured mark number density $N_M$ from the mark counter 150 is sent to the controller 260 and compared to the expected (selected) mark number density N. The mark counter 150 is used for quality control, i.e., to ensure that the correct (target) mark number density $N_T$ is being formed, to spot any missing marks 60, to find extra marks, and to identify incorrectly formed marks. Such marking errors can arise due to problems with the fiber speed SF, excess fiber vibration, issues with the ink-jet print head 110, and of course decentering of the fiber 50 relative to the ink-jet stream 115S.

With reference now to FIG. 1A and to FIG. 5, the marked fiber (fiber section 50MU) continues to the overcoat applicator 170 of the coating system 199. FIG. 6A is a cross-sectional view of the marked fiber (fiber section 50MU) taken at one of the marks 60 at the location a-a in FIG. 5 and illustrates an example ring-type mark 60 that makes a complete circuit of the optical fiber circumference (closed ring mark). FIG. 6B is similar to FIG. 6A and illustrates an example ring-type mark 60 that does not make a complete circuit of the outer surface 56 of the optical fiber 50, but that covers more than 180° of the optical fiber circumference (open ring mark).

The overcoat applicator 170 deposits an overcoat material 176 on the outer surface 56 of the marked fiber of fiber section 50MU to form the covered fiber of covered fiber section 50MC. The overcoat material 176 forms a protective overcoat 180 over the entire outer surface 56, including any marks 60 thereon. In an example, the overcoat applicator 170 comprises a coating tube 178 with an interior 179 through with the fiber path FP passes. The overcoat material 176 is provided to the interior 179 so that the fiber 50 passes through the overcoat material 176, which is substantially uniformly applied around the circumference (or portion thereof) of the outer surface 56 of the marked fiber (fiber section 50MU).

In an example, the overcoat material 176 is at least semi-transparent so that the marks 60 are visible through the overcoat 180. Further in an example, the overcoat material 176 can be colored (e.g., via a pigment) to define a colored overcoat 180, e.g., yellow for submarine fibers 50. In an example, the overcoat material 176 is light-curable, e.g., by ultraviolet (UV) radiation. In an example, the overcoat material 176 comprises a UV-curable acrylate. The main purpose of the overcoat 180 is to protect the marks 60 from external wear, such as from handling by field personnel, abrasion or rubbing against adjacent fibers or cable surfaces, etc.

Upon exit from overcoat applicator 170, the fiber 50 is passed through the curing system 190 to cure the overcoat material 176. In an example, the curing system 190 is light based and is configured to generate actinic light 196 (e.g., UV radiation) that irradiates the overcoat material 176 and cures it to form overcoat 180. In an example, the curing system 190 has an interior 195 and the actinic light 196 is incident upon the overcoat material 176 from substantially 360°.

Figure 7A:
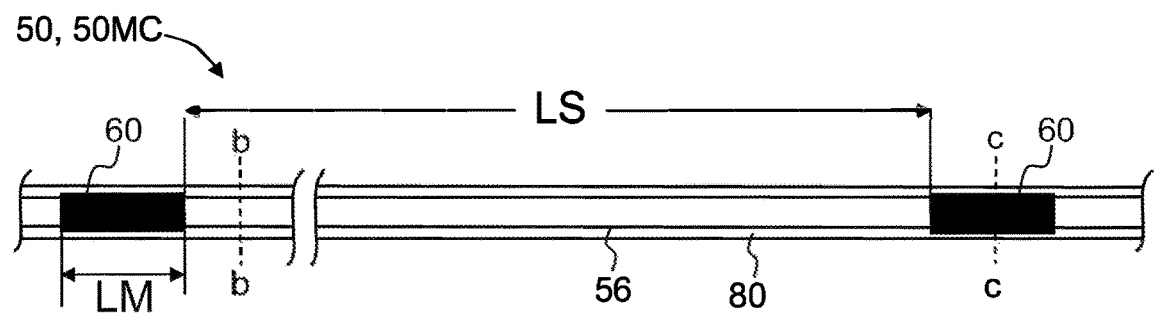
FIG. 7A is a close-up cross-sectional view of an example of a marked and coated optical fiber illustrating axial dimensions for the mark length (LM) and the mark spacing (LS).
Figure 7B:
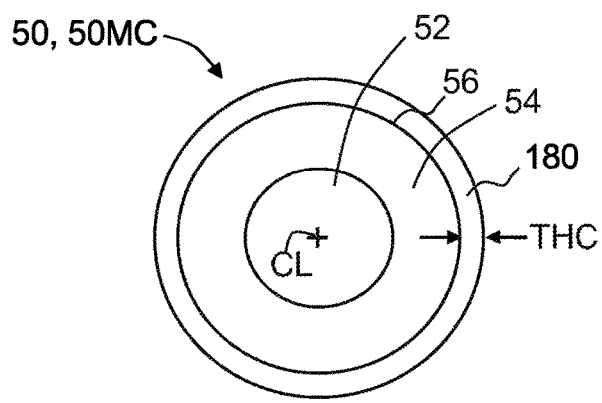
FIG. 7B is a cross-sectional view of the marked and coated optical fiber as taken along the line b-b in FIG. 7A at a location where there is no mark, and showing the thickness (THC) of the protective coating formed on the outer surface of the optical fiber.
Figure 7C:
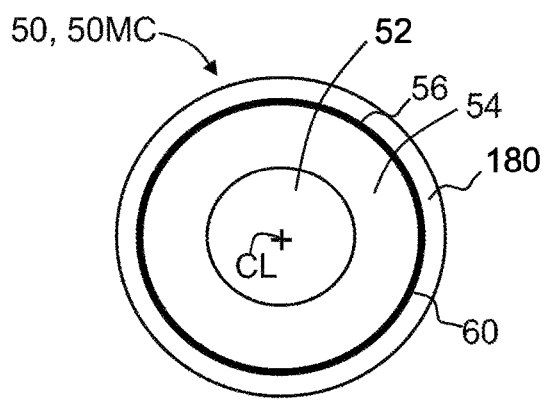
FIG. 7C is similar to FIGS. 7A and 7B and is taken along the line c-c in FIG. 7A at a mark location.
Figure 8A:
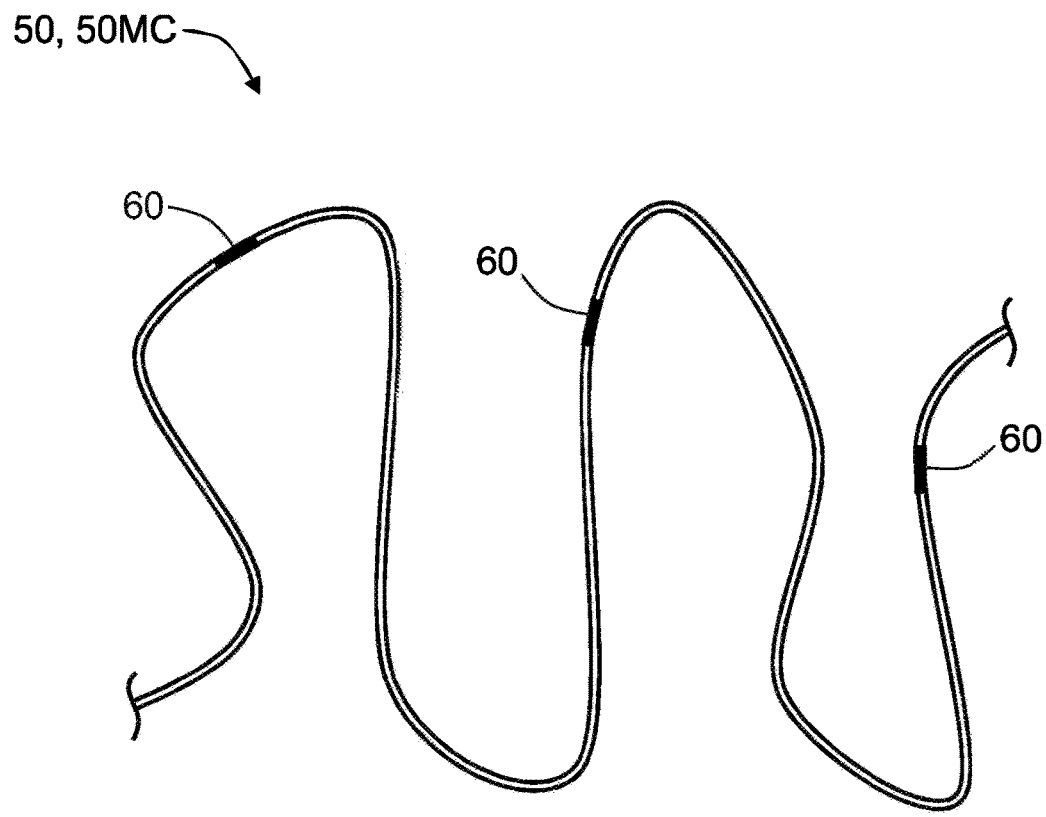
FIG. 8A is a schematic diagram of a section of the marked and coated optical fiber showing the spaced-apart marks.

FIG. 7A is a close-up cross-sectional view of an example of the resulting covered fiber (fiber section 50MC). FIGS. 7B and 7C are cross-sectional views of the covered fiber as taken at an unmarked location b-b and at a marked location c-c. The overcoat 180 has a thickness THC, which in an example is in the range from 3 μm to 8 μm. FIG. 8A is a schematic diagram of a section of the covered fiber (fiber section 50MC) showing the spaced-apart marks 60 as seen through the overcoat 180.

Figure 8B:
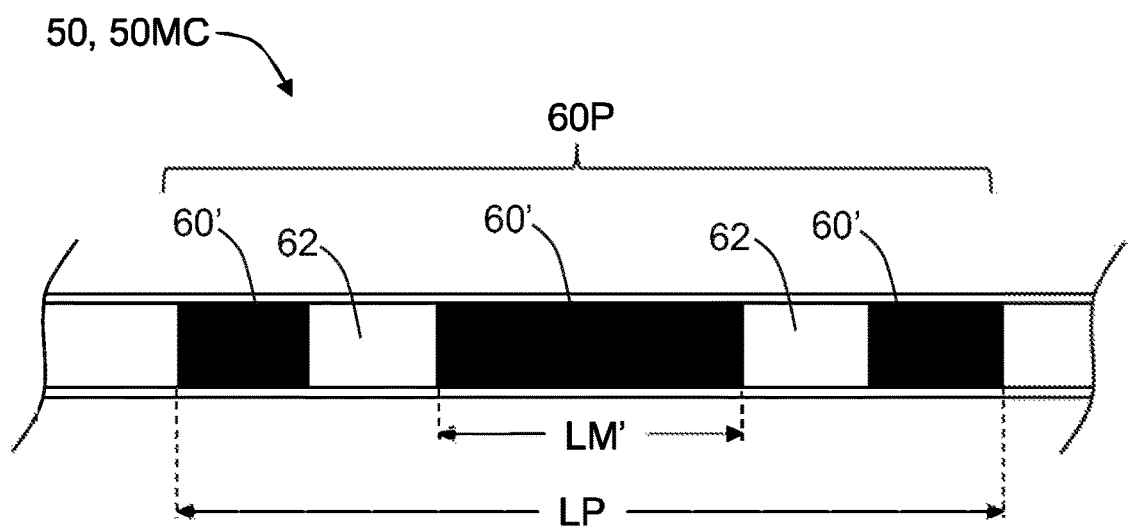
FIG. 8B is a close-up view of a portion of an example marked and coated optical fiber showing an example of a patterned mark comprising closely spaced marks formed over a pattern length.

As noted above, an embodiment of the marking unit 100 can include more than one ink-jet printer head 110. Such an embodiment can be used to form multiple closely spaced marks 60 at the marking location ML. FIG. 8B is a close-up view of an example section of a covered fiber (fiber section 50MC) showing an example of a patterned mark 60P formed over a pattern length LP using an embodiment of the marking unit 100 having multiple ink-jet printer heads 110, such as shown in FIG. 1C. In an example, the different ink-jet printer heads 110 are used to create closely spaced mark segments 60' to define the patterned mark 60P. The mark segments 60' can be the same length or can include one or more different lengths. The patterned mark 60P of FIG. 7B is formed by three distinct (different) mark segments 60' by way of example, with the mark segments 60' separated by small gaps 62. In an example, the pattern length LP can be 20 mm or 15 mm or 10 mm. In an example, 1.5·LM≥LP≥4·LM, while in another example, LP≈LM.

Adjacent patterned marks 60P can be separated by a sufficient spacing LS to distinguish the patterned marks from each other, e.g., LS≥20 mm or 250 mm≥LS≥20 mm. In an example, the operation of the multiple ink-jet printer heads 110 to form the mark segments 60' that define the patterned marks 60P is coordinated by the controller 300. Thus, in an example where patterned marks 60P are formed, in FIG. 8A the marks 60 on the covered fiber (fiber section 50MC) could be shown as patterned marks 60P. In an example, a combination of isolated marks 60 and patterned marks 60P can be used to form the covered fiber. A given patterned mark 60P is considered to be a type of mark 60 that has at least one gap 62 (or equivalently, at least two spaced apart mark segments 60') over the limited pattern length LP. In an example, the mark segments 60' can each have a mark segment length LM'≤LM.

Figure 9:
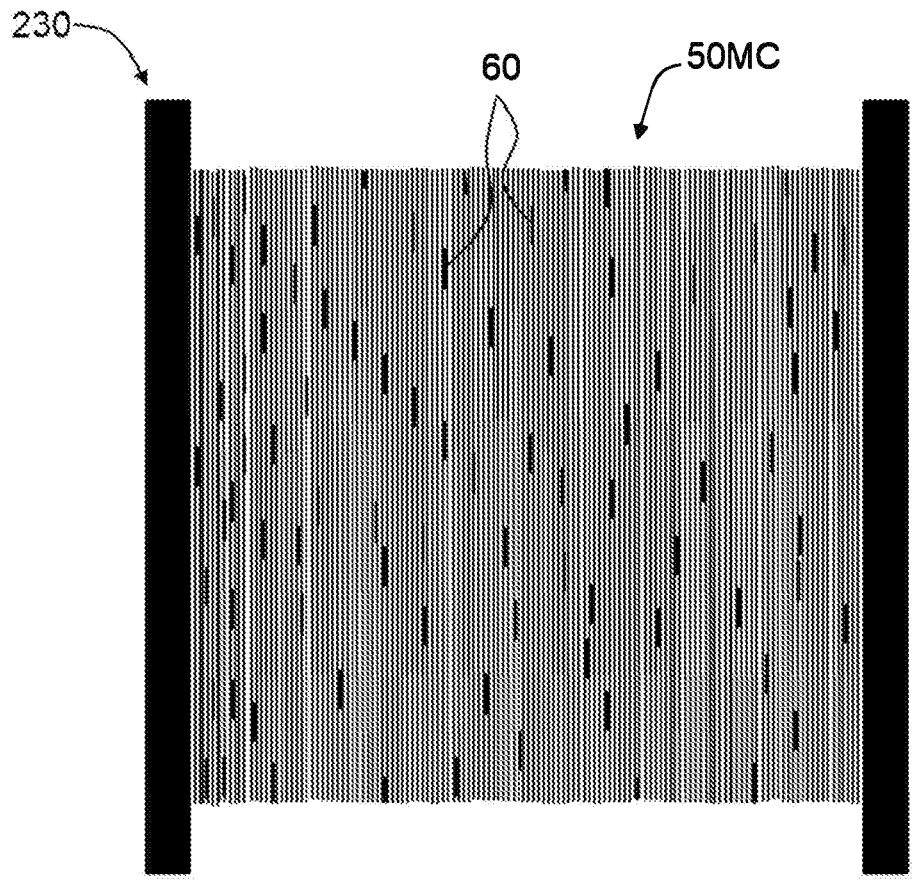
FIG. 9 is a side view of an example marked and coated fiber as wound around a take-up reel, illustrating how the marks are visible when viewing the take-up reel

With reference again to FIG. 1A, the covered fiber (fiber section 50MC) continues to the take-up module 220 and it taken up by and stored in take-up reel 230. FIG. 9 is a side view of an example of the covered fiber (fiber section 50MC) as wound around a take-up reel 230, illustrating how the marks 60 are visible when the covered fiber is store on the take-up reel 230. This allows for quick identification of the stored covered fiber.

Measurements and Experiments

Attenuation measurements were made on covered fibers with various marking lengths LM and marking spacings LS and it was found that for all reasonable markings lengths LM, mark spacings LS and number densities N, any additional attenuation due to the presence of the marks was not significant.

Experiments were also conducted at a high fiber speed of 14 m/s and for a number density of N=4/m, and it was found that the measure number density $N_M$ stayed within the range of 3.5 to 4.5 based on an average number of counted marks 60 per meter for two or more meter-long fiber sections 50MC of the fiber. Thus, in an example, quality control of the marks 60 can be maintained by using the mark counter 150 and the controller 260 to count marks 60 and generate an average number density $N_A$ and comparing the average number density $N_A$ to a tolerance $\Delta N$ on the variation in the number density with respect to a target number density $N_T$. In an example, the variation $\Delta N$ on measured average number density $N_M$ over two or more select lengths of fiber 50 can be no greater than +/−0.5 mark/meter, so that for a target number density of N=4/m, an averaged measured number density $N_A$ in the range between 3.5/m and 4.5/m would be acceptable from a quality control viewpoint.

Aspect 1 of the description is:
A method of accurately marking an optical fiber having an outer surface, comprising:
moving an optical fiber at a line speed greater than 2 m/s past a marking unit configured to intermittently dispense an ink-jet stream to form spaced-apart marks on the outer surface of the optical fiber;
laterally moving the optical fiber relative to the ink-jet stream in lateral increments δz to define a plurality of lateral positions of the optical fiber;
measuring a mark number density of the marks for each lateral position of the plurality of lateral positions;
establishing a range of the lateral positions where the mark number density is within a mark number density range;
setting the optical fiber to a fiber marking position within the range of lateral positions; and
forming the marks on the outer surface of the optical fiber with the optical fiber set to the fiber marking position.

Aspect 2 of the description is:
The method according to Aspect 1, where the fiber marking position is substantially in the middle of the range of lateral positions.

Aspect 3 of the description is:
The method according to Aspect 1 or 2, wherein the lateral increments δz are in a range from 0.1 micron to 10 microns.

Aspect 4 of the description is:
The method according to any of Aspects 1-3, wherein the act of laterally moving the optical fiber in the lateral increments δz comprises:
operably engaging the optical fiber with a fiber positioning device; and laterally moving the fiber positioning device in the lateral increments δz.

Aspect 5 of the description is:
The method according to Aspect 4, wherein the operable engaging of the optical fiber comprises passing the optical fiber through a gap defined by respective first and second outer surfaces of first and second guide members, wherein the optical fiber contacts the first and second outer surfaces of the first and second guide members.

Aspect 6 of the description is:
The method according to Aspect 5, wherein the first and second guide members are cylindrical and counter-rotating.

Aspect 7 of the description is:
The method according to Aspect 5 or 6, wherein the fiber positioning device comprises a movable stage that operably supports the first and second guide members, and wherein the laterally moving of the fiber positioning device comprises laterally moving the movable stage with a drive motor.

Aspect 8 of the description is:
The method according to Aspect 7, further comprising controlling the drive motor with a controller.

Aspect 9 of the description is:
The method according to any of Aspects 1-8, further comprising measuring the measurement positions of the optical fiber using a position sensor operably disposed at or adjacent the marking unit.

Aspect 10 of the description is:
The method according to any of Aspects 1-9, wherein the measuring of mark number density comprises moving the optical fiber past a mark counter operably disposed downstream of the marking unit.

Aspect 11 of the description is:
A method of accurately marking an optical fiber having an outer surface, comprising: moving an optical fiber at a line speed greater than 2 m/s past a marking unit, the marking unit intermittently dispensing an ink-jet stream to form spaced apart marks on the outer surface of the optical fiber;
moving the optical fiber in lateral increments δz relative to the ink-jet stream to define a plurality of different lateral measurement positions, wherein multiple ones of the plurality of different lateral measurement positions cause the optical fiber to intersect the ink-jet stream;
for each different lateral measurement position, measuring a mark number density $N_M$ of the marks formed on the outer surface of the optical fiber to establish a set $S_M$ of measured mark number densities $N_M$;
comparing the measured mark number densities for the different lateral measurement positions to a target mark number density range;
identifying a range of the different lateral measurement positions over which the measured mark number densities are within the target mark number density range;
setting the fiber to an optimum fiber marking position that resides substantially in the middle of the range of the different lateral measurement positions; and
forming the marks on the outer surface of the optical fiber with the fiber marking position set at the optimum fiber marking position.

Aspect 12 of the description is:
The method according to Aspect 11, wherein the lateral increments δz are in a range from 0.1 micron to 10 micron.

Aspect 13 of the description is:
The method according to Aspect 11 or 12, wherein the act of moving the optical fiber in the lateral increments δz comprises:
operably engaging the optical fiber with a fiber positioning device; and laterally moving the fiber positioning device in the lateral increments δz.

Aspect 14 of the description is:
The method according to Aspect 13, wherein the operable engaging of the optical fiber comprises passing the optical fiber through a gap defined by respective first and second outer surface of first and second counter-rotating guide members, wherein the optical fiber contacts the first and second outer surfaces.

Aspect 15 of the description is:
The method according to Aspect 14, wherein the fiber positioning device comprises a movable stage that operably supports the counter-rotating guide members, and wherein the laterally moving of the fiber positioning device comprises laterally moving the movable stage with a drive motor.

Aspect 16 of the description is:
The method according to Aspect 15, further comprising controlling the drive motor with a controller.

Aspect 17 of the description is:
The method according to any of Aspects 11-16, further comprising measuring the different lateral measurement positions of the optical fiber using a position sensor operably disposed at or adjacent the marking unit.

Aspect 18 of the description is:
The method according to any of Aspects 11-17, wherein the measuring a mark number density comprises moving the optical fiber past a mark counter operably disposed downstream of the marking unit.

Aspect 19 of the description is:
The method according any of Aspects 11-18, further comprising:
drying the ink marks at a drying location to form dried ink marks; and
applying a substantially transparent protective coating over the dried ink marks and the outer surface of the moving optical fiber, wherein the dried ink marks are visible through the substantially transparent protective coating.

Aspect 20 of the description is:
The method according to Aspect 19, wherein the dried ink marks are colored.

Aspect 21 of the description is:
A method of accurately forming spaced-apart marks on an optical fiber, comprising:
causing the optical fiber to move over a fiber path, wherein the moving optical fiber has an outer surface;
printing the spaced-apart marks on the outer surface of the moving optical fiber with ink from an ink-jet printer head for different lateral positions of the moving optical fiber relative to the ink-jet printer head;
measuring a mark number density of the marks for each of the different lateral positions and comparing the measured mark number densities to a target mark number density range to establish a range of fiber marking positions defined by the different lateral positions wherein the measured mark number densities are within the target mark number density range;
placing the optical fiber at a fiber marking position that is substantially at the middle of the range of fiber marking positions; and
forming the spaced apart marks on the optical fiber with the optical fiber at the fiber marking position.

Aspect 22 of the description is:
The method according to Aspect 21, wherein the marks comprise wet ink marks and further comprising:
drying the wet ink marks at a drying location to form dried ink marks; and applying a substantially transparent protective coating over the dried ink marks and the outer surface of the moving optical fiber, wherein the dried ink marks are visible through the substantially transparent protective coating.

Aspect 23 of the description is:
The method according to Aspect 21 or 22, further comprising:
monitoring the lateral position of the optical fiber and the mark number density of the marks formed on the optical fiber; and
adjusting the lateral position of the optical fiber to be within the range of fiber marking positions if the monitored mark number density of the marks falls outside of the target mark number density range.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of accurately marking an optical fiber having an outer surface, comprising:
    moving an optical fiber at a line speed greater than 2 m/s past a marking unit configured to intermittently dispense an ink-jet stream to form spaced-apart marks on the outer surface of the optical fiber;
    laterally moving the optical fiber relative to the ink-jet stream in lateral increments δz to define a plurality of lateral positions of the optical fiber;
    measuring a mark number density of the marks for each lateral position of the plurality of lateral positions;
    establishing a range of the lateral positions where the mark number density is within a mark number density range;
    setting the optical fiber to a fiber marking position within the range of lateral positions; and
    forming the marks on the outer surface of the optical fiber with the optical fiber set to the fiber marking position.

2. The method according to claim 1, where the fiber marking position is substantially in the middle of the range of lateral positions.

3. The method according to claim 1, wherein the lateral increments δz are in a range from 0.1 micron to 10 microns.

4. The method according to claim 1, wherein the act of laterally moving the optical fiber in the lateral increments δz comprises:
    operably engaging the optical fiber with a fiber positioning device; and
    laterally moving the fiber positioning device in the lateral increments δz.

5. The method according to claim 4, wherein the operable engaging of the optical fiber comprises passing the optical fiber through a gap defined by respective first and second outer surfaces of first and second guide members, wherein the optical fiber contacts the first and second outer surfaces of the first and second guide members.

6. The method according to claim 5, wherein the first and second guide members are cylindrical and counter-rotating.

7. The method according to claim 5, wherein the fiber positioning device comprises a movable stage that operably supports the first and second guide members, and wherein the laterally moving of the fiber positioning device comprises laterally moving the movable stage with a drive motor.

8. The method according to claim 7, further comprising controlling the drive motor with a controller.

9. The method according to claim 1, further comprising measuring the measurement positions of the optical fiber using a position sensor operably disposed at or adjacent the marking unit.

10. The method according to claim 1, wherein the measuring of mark number density comprises moving the optical fiber past a mark counter operably disposed downstream of the marking unit.

11. A method of accurately marking an optical fiber having an outer surface, comprising:
    moving an optical fiber at a line speed greater than 2 m/s past a marking unit, the marking unit intermittently dispensing an ink-jet stream to form spaced apart marks on the outer surface of the optical fiber;
    moving the optical fiber in lateral increments δz relative to the ink-jet stream to define a plurality of different lateral measurement positions, wherein multiple ones of the plurality of different lateral measurement positions cause the optical fiber to intersect the ink-jet stream;
    for each different lateral measurement position, measuring a mark number density $N_M$ of the marks formed on the outer surface of the optical fiber to establish a set $S_M$ of measured mark number densities $N_M$;
    comparing the measured mark number densities for the different lateral measurement positions to a target mark number density range;
    identifying a range of the different lateral measurement positions over which the measured mark number densities are within the target mark number density range;
    setting the fiber to an optimum fiber marking position that resides substantially in the middle of the range of the different lateral measurement positions; and
    forming the marks on the outer surface of the optical fiber with the fiber marking position set at the optimum fiber marking position.

12. The method according to claim 11, wherein the lateral increments δz are in a range from 0.1 micron to 10 micron.

13. The method according to claim 11, wherein the act of moving the optical fiber in the lateral increments δz comprises:
    operably engaging the optical fiber with a fiber positioning device; and
    laterally moving the fiber positioning device in the lateral increments δz.

14. The method according to claim 13, wherein the operable engaging of the optical fiber comprises passing the optical fiber through a gap defined by respective first and second outer surface of first and second counter-rotating guide members, wherein the optical fiber contacts the first and second outer surfaces.

15. The method according to claim 14, wherein the fiber positioning device comprises a movable stage that operably supports the counter-rotating guide members, and wherein the laterally moving of the fiber positioning device comprises laterally moving the movable stage with a drive motor.

16. The method according to claim 15, further comprising controlling the drive motor with a controller.

17. The method according to claim 11, further comprising measuring the different lateral measurement positions of the optical fiber using a position sensor operably disposed at or adjacent the marking unit.

18. The method according to claim 11, wherein the measuring a mark number density comprises moving the optical fiber past a mark counter operably disposed downstream of the marking unit.

19. The method according claim 11, further comprising:
    drying the ink marks at a drying location to form dried ink marks; and
    applying a substantially transparent protective coating over the dried ink marks and the outer surface of the moving optical fiber, wherein the dried ink marks are visible through the substantially transparent protective coating.

20. The method according to claim 19, wherein the dried ink marks are colored.

21. A method of accurately forming spaced-apart marks on an optical fiber, comprising:
    causing the optical fiber to move over a fiber path, wherein the moving optical fiber has an outer surface;
    printing the spaced-apart marks on the outer surface of the moving optical fiber with ink from an ink-jet printer head for different lateral positions of the moving optical fiber relative to the ink-jet printer head;
    measuring a mark number density of the marks for each of the different lateral positions and comparing the measured mark number densities to a target mark number density range to establish a range of fiber marking positions defined by the different lateral positions wherein the measured mark number densities are within the target mark number density range;
    placing the optical fiber at a fiber marking position that is substantially at the middle of the range of fiber marking positions; and
    forming the spaced apart marks on the optical fiber with the optical fiber at the fiber marking position.

22. The method according to claim 21, wherein the marks comprise wet ink marks and further comprising:
    drying the wet ink marks at a drying location to form dried ink marks; and
    applying a substantially transparent protective coating over the dried ink marks and the outer surface of the moving optical fiber, wherein the dried ink marks are visible through the substantially transparent protective coating.

23. The method according to claim 21, further comprising:
    monitoring the lateral position of the optical fiber and the mark number density of the marks formed on the optical fiber; and
    adjusting the lateral position of the optical fiber to be within the range of fiber marking positions if the monitored mark number density of the marks falls outside of the target mark number density range.

* * * * *

UNITED STATES PATENT AND TRADEMARK OFFICE
CERTIFICATE OF CORRECTION

PATENT NO. : 11,414,344 B2
APPLICATION NO. : 16/930784
DATED : August 16, 2022
INVENTOR(S) : Steven Howard Dunn et al.

It is certified that error appears in the above-identified patent and that said Letters Patent is hereby corrected as shown below:

In the Claims

In Column 21, Line 40, in Claim 12, delete "10 micron." and insert -- 10 microns. --.

In Column 22, Line 11, in Claim 19, after "according" insert -- to --.

Signed and Sealed this
Twenty-second Day of November, 2022

Katherine Kelly Vidal
Director of the United States Patent and Trademark Office